(12) United States Patent
Duggal et al.

(10) Patent No.: US 12,190,104 B2
(45) Date of Patent: Jan. 7, 2025

(54) RESOURCE PROCESSING USING AN INTERMEDIARY FOR CONTEXT-BASED CUSTOMIZATION OF INTERACTION DELIVERABLES

(71) Applicant: EnterpriseWeb LLC, Glens Falls, NY (US)

(72) Inventors: Dave M. Duggal, Glens Falls, NY (US); William J. Malyk, Guelph (CA)

(73) Assignee: Enterprise Web LLC, Glens Falls, NY (US)

( * ) Notice: Subject to any disclaimer, the term of this patent is extended or adjusted under 35 U.S.C. 154(b) by 120 days.

(21) Appl. No.: 17/087,267

(22) Filed: Nov. 2, 2020

(65) Prior Publication Data
US 2021/0389943 A1  Dec. 16, 2021

Related U.S. Application Data

(63) Continuation of application No. 14/936,020, filed on Nov. 9, 2015, now Pat. No. 10,824,418, which is a (Continued)

(51) Int. Cl.
*G06F 8/20* (2018.01)
*G06F 8/70* (2018.01)
*H04L 67/02* (2022.01)

(52) U.S. Cl.
CPC .................. *G06F 8/70* (2013.01); *G06F 8/20* (2013.01); *H04L 67/02* (2013.01)

(58) Field of Classification Search
USPC ....................................................... 717/120
See application file for complete search history.

(56) References Cited

U.S. PATENT DOCUMENTS 5,469,533 A  11/1995  Dennis
6,249,291 B1  6/2001  Popp et al.
(Continued)

OTHER PUBLICATIONS

S. Kumaran, R. Liu, P. Dhoolia, T. Heath, P. Nandi and F. Pinel, "A RESTful Architecture for Service-Oriented Business Process Execution," 2008 IEEE International Conference on e-Business Engineering, 2008, pp. 197-204. (Year: 2008).*

(Continued)

*Primary Examiner* — Jason D Mitchell
(74) *Attorney, Agent, or Firm* — Sterne, Kessler, Goldstein & Fox

(57) ABSTRACT

A software application includes work order resources, each of which defines an atomic operation for the software application, and a construction service resource, which processes the work order resources in response to all interaction requests for the software application. Each interaction request is received from a client and identifies a corresponding work order, which the construction service processes to dynamically construct a set of deliverables, which can include a custom representation of the work order. While processing the interaction request, the construction service, as directed by the work order, can make one or more requests to context resources for context information corresponding to an activity for which the interaction was requested to construct the set of deliverables. The work order resource can comprise a reflective program that enables the construction service to dynamically determine and construct the set of deliverables, including the next appropriate interaction(s) using the context information, thereby directing a set of atomic operations as part of an activity being performed and enabling the dynamic context-based construction of interaction deliverables.

20 Claims, 21 Drawing Sheets

Related U.S. Application Data continuation of application No. 14/022,033, filed on Sep. 9, 2013, now Pat. No. 9,182,977, which is a continuation of application No. 12/698,361, filed on Feb. 2, 2010, now Pat. No. 8,533,675.

(60) Provisional application No. 61/149,179, filed on Feb. 2, 2009.

(56) References Cited

U.S. PATENT DOCUMENTS

| | | | |
|---|---|---|---|
| 6,268,852 | B1 | 7/2001 | Lindhorst et al. |
| 7,089,316 | B2 | 8/2006 | Anderson et al. |
| 7,095,715 | B2 | 8/2006 | Buckman et al. |
| 7,165,239 | B2 | 1/2007 | Hejlsberg et al. |
| 7,310,684 | B2 | 12/2007 | Patrick et al. |
| 7,444,620 | B2 | 10/2008 | Marvin |
| 7,506,302 | B2 | 3/2009 | Bahrami |
| 7,542,956 | B2 | 6/2009 | Strassner et al. |
| 7,546,295 | B2 | 6/2009 | Brave et al. |
| 7,565,613 | B2 | 7/2009 | Forney |
| 7,574,663 | B2 | 8/2009 | Popp et al. |
| 7,580,930 | B2 | 8/2009 | Brave et al. |
| 7,613,713 | B2 | 11/2009 | Forney |
| 7,633,868 | B2 | 12/2009 | Buckman et al. |
| 7,644,007 | B2 | 1/2010 | Elazouni |
| 7,652,594 | B2 | 1/2010 | Lamont et al. |
| 7,652,680 | B2 | 1/2010 | Popp et al. |
| 7,653,008 | B2 | 1/2010 | Patrick et al. |
| 7,653,638 | B2 | 1/2010 | Forney |
| 7,984,096 | B2 | 7/2011 | Beoughter et al. |
| 8,074,201 | B2 * | 12/2011 | Ghercioiu ........... G06F 9/44521 717/121 |
| 8,341,212 | B2 * | 12/2012 | Diament ................ G06F 8/656 717/121 |
| 8,407,716 | B2 | 3/2013 | Nixon et al. |
| 8,533,675 | B2 * | 9/2013 | Duggal .................. H04L 67/02 717/114 |
| 9,182,977 | B2 * | 11/2015 | Duggal ..................... G06F 8/20 |
| 10,824,418 | B2 * | 11/2020 | Duggal ................... H04L 67/02 |
| 2002/0055849 | A1 | 5/2002 | Georgakopoulos et al. |
| 2002/0138659 | A1 | 9/2002 | Trabaris et al. |
| 2002/0198765 | A1 | 12/2002 | Magrino et al. |
| 2003/0012147 | A1 | 1/2003 | Buckman et al. |
| 2003/0037181 | A1 | 2/2003 | Freed |
| 2003/0061266 | A1 | 3/2003 | Ouchi |
| 2003/0236877 | A1 | 12/2003 | Allan |
| 2004/0015821 | A1 | 1/2004 | Lu et al. |
| 2004/0064721 | A1 | 4/2004 | Murching et al. |
| 2004/0078777 | A1 | 4/2004 | Baharami |
| 2004/0098311 | A1 | 5/2004 | Nair et al. |
| 2004/0123109 | A1 | 6/2004 | Choi |
| 2004/0172618 | A1 | 9/2004 | Marvin |
| 2004/0225995 | A1 | 11/2004 | Marvin et al. |
| 2005/0015775 | A1 | 1/2005 | Russell et al. |
| 2005/0022157 | A1 | 1/2005 | Brendle et al. |
| 2005/0027585 | A1 | 2/2005 | Wodtke et al. |
| 2005/0264581 | A1 | 12/2005 | Patrick et al. |
| 2005/0267892 | A1 | 12/2005 | Patrick et al. |
| 2005/0270970 | A1 | 12/2005 | Patrick et al. |
| 2005/0273497 | A1 | 12/2005 | Patrick et al. |
| 2005/0273502 | A1 | 12/2005 | Patrick et al. |
| 2005/0273516 | A1 | 12/2005 | Patrick et al. |
| 2005/0273517 | A1 | 12/2005 | Patrick et al. |
| 2005/0273518 | A1 | 12/2005 | Patrick et al. |
| 2005/0273520 | A1 | 12/2005 | Patrick et al. |
| 2005/0273521 | A1 | 12/2005 | Patrick et al. |
| 2005/0273847 | A1 | 12/2005 | Patrick et al. |
| 2005/0278335 | A1 | 12/2005 | Patrick et al. |
| 2005/0278374 | A1 | 12/2005 | Patrick et al. |
| 2006/0005063 | A1 | 1/2006 | Patrick et al. |
| 2006/0007918 | A1 | 1/2006 | Patrick et al. |
| 2006/0031353 | A1 | 2/2006 | Patrick et al. |
| 2006/0031354 | A1 | 2/2006 | Patrick et al. |
| 2006/0031355 | A1 | 2/2006 | Patrick et al. |
| 2006/0031431 | A1 | 2/2006 | Patrick et al. |
| 2006/0031432 | A1 | 2/2006 | Patrick et al. |
| 2006/0031433 | A1 | 2/2006 | Patrick et al. |
| 2006/0031481 | A1 | 2/2006 | Patrick et al. |
| 2006/0031930 | A1 | 2/2006 | Patrick et al. |
| 2006/0034237 | A1 | 2/2006 | Patrick et al. |
| 2006/0069791 | A1 | 3/2006 | Patrick et al. |
| 2006/0069995 | A1 * | 3/2006 | Thompson .............. H04L 67/02 715/700 |
| 2006/0080419 | A1 | 4/2006 | Patrick et al. |
| 2006/0136555 | A1 | 6/2006 | Patrick et al. |
| 2006/0167841 | A1 * | 7/2006 | Allan ...................... H04L 67/02 |
| 2006/0212593 | A1 | 9/2006 | Patrick et al. |
| 2006/0239273 | A1 | 10/2006 | Buckman et al. |
| 2006/0264202 | A1 | 11/2006 | Hagmeier et al. |
| 2007/0069855 | A1 | 3/2007 | Boland et al. |
| 2007/0069896 | A1 | 3/2007 | Boland et al. |
| 2007/0100967 | A1 * | 5/2007 | Smith ....................... G06F 8/20 709/219 |
| 2007/0168522 | A1 * | 7/2007 | Van Valen, III ........ H04L 67/02 709/228 |
| 2007/0244990 | A1 * | 10/2007 | Wells ..................... G06F 16/986 709/218 |
| 2008/0034367 | A1 | 2/2008 | Patrick et al. |
| 2008/0072235 | A1 * | 3/2008 | Rodgers .............. G06F 9/44521 718/108 |
| 2008/0077932 | A1 | 3/2008 | Ruppach et al. |
| 2008/0155104 | A1 | 6/2008 | Quinn et al. |
| 2008/0158605 | A1 | 7/2008 | Engbrocks et al. |
| 2008/0172488 | A1 | 7/2008 | Jawahar et al. |
| 2008/0186852 | A1 | 8/2008 | Sami et al. |
| 2008/0212963 | A1 | 9/2008 | Fortin et al. |
| 2008/0225706 | A1 | 9/2008 | Lange |
| 2008/0239167 | A1 | 10/2008 | Goldberg |
| 2008/0244319 | A1 | 10/2008 | Nehab et al. |
| 2008/0263206 | A1 | 10/2008 | Bivens et al. |
| 2008/0300844 | A1 | 12/2008 | Bahgchi et al. |
| 2008/0306751 | A1 | 12/2008 | Conroy et al. |
| 2008/0319757 | A1 | 12/2008 | Da Palma et al. |
| 2009/0024432 | A1 | 1/2009 | Bauters et al. |
| 2009/0077477 | A1 * | 3/2009 | Khan ....................... G06F 8/74 715/760 |
| 2009/0086752 | A1 | 4/2009 | Anderson et al. |
| 2009/0113156 | A1 | 4/2009 | Fujita et al. |
| 2009/0119334 | A1 | 5/2009 | Ahern et al. |
| 2009/0164621 | A1 | 6/2009 | Kothari et al. |
| 2009/0165021 | A1 | 6/2009 | Pinkston et al. |
| 2009/0193393 | A1 * | 7/2009 | Baldwin .................. G06F 8/38 717/114 |
| 2009/0217354 | A1 * | 8/2009 | Blum .................... H04L 63/10 726/3 |
| 2009/0241088 | A1 | 9/2009 | Dangeville et al. |
| 2009/0281996 | A1 | 11/2009 | Liu et al. |
| 2009/0319937 | A1 | 12/2009 | Molander |
| 2009/0323550 | A1 | 12/2009 | Buckman et al. |
| 2010/0010960 | A1 | 1/2010 | Singh |
| 2010/0011013 | A1 | 1/2010 | Singh |
| 2010/0070561 | A1 * | 3/2010 | Dhoolia .................. G06F 9/50 709/203 |
| 2010/0083222 | A1 * | 4/2010 | Maximilien ............. G06F 8/20 717/121 |
| 2010/0095266 | A1 | 4/2010 | Novak |
| 2010/0199260 | A1 | 8/2010 | Duggal et al. |
| 2011/0289126 | A1 | 11/2011 | Aikas et al. |
| 2011/0314080 | A1 | 12/2011 | Herberth et al. |
| 2016/0088023 | A1 * | 3/2016 | Handa .................... H04L 67/02 709/219 |

OTHER PUBLICATIONS

Roy Thomas Fielding and Richard N. Taylor. 2000. Architectural styles and the design of network-based software architectures. Ph.D. Dissertation. University of California, Irvine. (Year: 2000).*

Michael zur Muehlen, Jeffrey V. Nickerson, and Keith D. Swenson. 2005. Developing web services choreography standards: the case of REST vs. SOAP. Decis. Support Syst. 40, 1 (Jul. 2005), 9-29. (Year: 2004).*

(56) References Cited

OTHER PUBLICATIONS

Adams et al., YAWL, "Chapter 7, The Architecture," Sep. 21, 2009, 16 pages.
Battle et al., "Bridging the semantic Web and Web 2.0 with Representational State Transfer (REST)," Journal of 1/1/web Semantics, Nov. 17, 2007, 10 pages, vol. 6, No. 1.
Blair et al., "The Design of a Resource-Aware Reflective Middleware Architecture," 1999, 20 pages, Springer-Verlag Berlin Heidelberg.
Blair et al., "An Architecture for Next Generation Middleware," 1998, 16 pages, Distributed Multimedia Research group, Computing Department, Lancaster University, Bailrig, Lancaster, UK.
BPM Active VOS Business Process Management Suite from Active Endpoints, "Using ActiveVOS," Dale Unknown, Printed Mar. 17, 2010, 10 pages, http://www.activevos.com/products-features.php . . . .
BPM, Business Process Management, ActiveBPEL, ActiveVOS Comparison, "ActiveBPEL Engine / ActiveVOS Enterprise Edition Comparison," Dale Unknown, Printed Mar. 17, 2010, 3 pages, http://www.activevos.com/compare.
BPM Focus, "Cases Managed the World Over," Jun. 21, 2009, 6 pages, http://bpmfocus.wordpress.com/2009/06/21/Cases-managed-the-world-over/.
De Man, H., "Case Management: OMG RFP released," Sep. 24, 2009, 4 pages, http://www.brsilver.com/ bpmncase/ p. 31.
Dubray, J., "The Seven Fallacies of Business Process Execution," Dec. 4, 2007, 10 pages, http://www.infoq.com/articles/seven-fallacies-of-bpm.
Duran-Limon, H. et al., "Adaptive Resource Management in Middleware: A Survey," IEEE Distributed Systems Online 1541-4922, Jul. 2004, 13 pages, vol. 5, No. 7, IEEE Computer Society.
Fielding, R., "Architectural Styles and the Design of Network-based Software Architectures, Dissertation," 2000, 90 pages, University of California, Irvine.
Fielding, R., "REST APIs must be hypertext-driven," Oct. 20, 2008, 16 pages, roy.gbiv.com/untangled/2008/rest-apis-must-be-hypertext-driven.
Fiammante, M., The SOA Magazine, "Dynamic SOA and BPM," Sep. 25, 2009, 11 pages, http://www.soamag.com/132/0909-2.asp.
Grace et al., "A Reflective Framework for Fine-Grained Adaptation of Aspect-Oriented Compositions," Mar. 2008, J2 pages, Software Composition, Budapest.
Khare et al., "Extending the Representational State Transfer (REST) Architectural Style for Decentralized Systems," May 23, 2004, 10 pages, Proceedings of the 26th International Conference on Software Engineering (ICSE '04), University of California, Irvine.
Papyrus Platform Architecture, "Copying is the most sincere form of flattery!," Oct. 4, 2009, 4 pages. http://isispapyrus.wordpress.com/2009/10/04/copying-fattery.
Ye Peng et al., "A Reflective Information Model for Reusing Software Architecture," 2008, 6 pages, ISECS International colloquium on Computing, Communication, Control, and Management, IEEE.
Rodriguez, A., IBM, XP-002578060, "RESTful Web services: The basics," Nov. 6, 2008, 12 pages, IBM corporation.
SOA Consortium, "Business Architecture: The Missing Link between Business Strategy and Enterprise Architecture," Jan. 2010, 14 pages, Object Management Group.
Szepielak, D., "REST-Based Service Oriented Architecture for Dynamically Integrated Information Systems," 2008, 5 pages, Deutsches Elektronen-Synchrotron, Notkestrasse 85, 22607 Hamburg, Germany.
Thoughtworks, Webber, J., "Hateos: The Confusing Bit from REST," May 26, 2009, 45 pages.
Thoughts on Collaborative Planning, "It is All Taylors Fault," Jan. 8, 2010, 11 pages, http://kswenson.wordpress. com/2010/01/08/it-is-all-taylors-fault.
Tosic et al., "Improving Business Processes in the Australian Lending Industry," Abstract only of Seminar presented on Aug. 25, 2008, 1 page.
Van Der et al., "Flexibility as a Service," 2008, 15 pages, Eindhoven University of Technology, Eindhoven, The Netherlands.
Ku, et al., "Resource-Oriented Business Process Modeling of Ultra-Large-Scale Systems," May 2008, 4 pages, ULSSIS, Leipzig, Germany.
Xu, et al., "Resource-Oriented Architecture for Business Processes," 2008, 8 pages, 15th Asia-Pacific Software Engineering Conference.
Yuan, M. "JBoss Seam: A Deep Integration Framework," Jul. 1, 2007, 15 pages, http://www.theserverside.com/news/1364119/JBoss-Seam-A-Deep-Integration-Framework.
Zhu et al., "On Creating Industry-Wide Reference Architectures," Sep. 15-19, 2008, 7 pages, 12th International EEE Enterprise Distributed Object Computing Conference.
Zhu et al., "Reference Architecture for Lending Industry in ULS Systems," 2007, 3 pages, 29th International Conference on Software Engineering Workshops, (ICSEW '07).
Mitchell, J., U.S. Appl. No. 12/698,361, Notice of Allowance, Jul. 24, 2013, 24 pages.
Mitchell, J., U.S. Appl. No. 12/698,361, Office Action 1, Jan. 29, 2013, 31 pages.
Mitchell, J., U.S. Appl. No. 14/022,033, Notice of Allowance, Jul. 31, 2015, 13 pages.
Mitchell, J., U.S. Appl. No. 14/022,033, Office Action 1, Feb. 27, 2015, 21 pages.
European Examination Report for Application No. 10702981.1, Dec. 20, 2013, 7 pages.
European Examination Report for Application No. 10702981.1, Jun. 10, 2015, 8 pages.
Schmidt-Lorenz, S., International Application No. PCT/US2010/022849, International Search Report and Written opinion, May 4, 2010, 14 pages.
Nickitas-Etienne, A., International Application No. PCT/US2010/022849, International Preliminary Report on Patentability, Aug. 11, 2011, 7 pages.
"Microsoft Computer Dictionary", 2002, Microsoft Press, 5th ed, pp. 182 & 306 (Year: 2002).
Epiphany: Replace Hateos with "Hypermedia Describes Protocols," Jun. 2, 2009, 2 pages, http://blogs.gartner.com/nick_gall/2009/06/02/epiphany-replace-hateoas-with-hypermedia-describ . . . thoughwork.

\* cited by examiner

| ID | Name | Sponsor | PI | Dept | Budget | Status |
|---|---|---|---|---|---|---|
| ID8-03818 | Sample Grant Application | National Institutes of Health | Bill Malyk | Bio | $146,204.69 | Being Reviewed |

Contact PI: Bill Malyk  Sponsor: National Institutes of Health  Total Directs: $97,499.80
Admin Contact: Bill Malyk  Program: Research Project Grant (Parent R01)  Total Indirects: $48,704.90

| Lifecycle Event Manager | Cover Sheet | Project Description | Budget | Protocols | Documents | Certifications |

Stage: Application  Status: Internal Review  Lifecycle History  Actions ▼ -No Available Actions-  Go

Linked Items

| Item | Action | Initiated By | Time-Date | Status | Link |
|---|---|---|---|---|---|
| 1 | IRB Protocol - ID8-522-IRB | Bill Malyk | Mon Feb 01 2010 | Approved | View Protocol |
| ID8-03818-B | Task Invite Issued | Bill Malyk | Mon Feb 01 2010 | Component Complete | |

FIG. 12C

| ID | Name | Sponsor | PI | Dept ✎ | Budget | Status ✎ |
|---|---|---|---|---|---|---|
| ID8-03818 | Sample Grant Application | National Institutes of Health | Bill Malyk | Bio | $146,204.69 | Active |

Contact PI: Bill Malyk
Admin Contact: Bill Malyk

Sponsor: National Institutes of Health
Program: Research Project Grant (Parent R01)

Total Directs: $97,499.79
Total Indirects: $48,704.90

[ Lifecycle Event Manager ] [ Budget Viewer (PA) ] [ Account Viewer (PA) ] [ Cover Sheet ] [ Project Description ] [ Budget ] [ Protocols ] [ Documents ] [ Certifications ]

Lifecycle History

Stage: Award     Status: Active     Actions [ ✎ Continuation / Progress Report ] [ Go ]

*Linked Items*

Link  View Protocol

| Item | Action | Initiated By | Time/Date | Status |
|---|---|---|---|---|
| 1 | IRB Protocol - ID8-522-IRB | Bill Malyk | Mon Feb 01 2010 | Approved |
| ID8-03818-B | Task Invite Issued | Bill Malyk | Mon Feb 01 2010 | Component Complete |
| Opp-3 | Account Setup | Bill Malyk | Mon Feb 01 2010 | *In Progress* |

FIG. 12D

| Lifecycle Event Manager | Budget Viewer (PA) | Account Viewer (PA) | Cover Sheet | Project Description | Budget | Protocols | Documents | Certifications |

Contact PI: Bill Malyk  Sponsor: National Institutes of Health  Total Directs: $97,499.79
Admin Contact: Bill Malyk  Program: Research Project Grant (Parent R01)  Total Indirects: $48,704.90

Stage: Award  Status: Active

Lifecycle History  Actions ▼ Amendment / Modification  Go

Linked Items

| Item | Action | Initiated By | Time/Date | Status | Link |
|---|---|---|---|---|---|
| 1 | IRB Protocol - ID8-522-IRB | Bill Malyk | Mon Feb 01 2010 | Approved | View Protocol |
| ID8-03818-B | Task Invite Issued | Bill Malyk | Mon Feb 01 2010 | Component Complete | |
| Opp-3 | Account Setup | Bill Malyk | Mon Feb 01 2010 | Accounts Active | |
| Opp-4 | Continuation / Progress Report | Dave Duggal | Mon Feb 01 2010 | In Review | View PHS2590 |
| Opp-5 | Amendment / Modification | Dave Duggal | Mon Feb 01 2010 | In Review | |
| Opp-6 | Expenditures | Dave Duggal | Mon Feb 01 2010 | Accepted | |

FIG. 12E

Lifecycle History

Operation 1: New Project Created
- Who: Creator Name
- Start: Date/Time
- End: Date/Time
- Result: Completed Operation 2: Application Sent for Department Review
- Who: Reviewer Name
- Start: Date/Time
- End: Date/Time
- Result: Passed Review Operation 3: Reviewing Against Presubmission Checklist
- Who: Reviewer Name
- Start: Date/Time
- End: Date/Time
- Result: Checklist Complete Operation 2: Application Being Submitted to Grants.gov
- Currently with: Submitter Name
- Started: Date/Time

RESOURCE PROCESSING USING AN INTERMEDIARY FOR CONTEXT-BASED CUSTOMIZATION OF INTERACTION DELIVERABLES

REFERENCE TO RELATED APPLICATIONS

The current application is a continuation of U.S. Nonprovisional patent application Ser. No. 14/936,020, which was filed on 9 Nov. 2015, entitled "RESOURCE PROCESSING USING AN INTERMEDIARY FOR CONTEXT-BASED CUSTOMIZATION OF INTERACTION DELIVERABLES," which is a continuation of U.S. Nonprovisional patent application Ser. No. 14/022,033, filed on 9 Sep. 2013, entitled "RESOURCE PROCESSING USING AN INTERMEDIARY FOR CONTEXT-BASED CUSTOMIZATION OF INTERACTION DELIVERABLES," which issued as U.S. Pat. No. 9,182,977, and which is a continuation of U.S. Nonprovisional patent application Ser. No. 12/698,361, which was filed on 2 Feb. 2010, entitled "RESOURCE PROCESSING USING AN INTERMEDIARY FOR CONTEXT-BASED CUSTOMIZATION OF INTERACTION DELIVERABLES," which issued as U.S. Pat. No. 8,533,675 on 10 Sep. 2013, which claims the benefit of U.S. Provisional Application No. 61/149,179, titled "DYNAMIC CONTEXT-BASED SYSTEM INTERACTION CONSTRUCTION", filed on 2 Feb. 2009, each of which is hereby incorporated by reference.

TECHNICAL FIELD

The disclosure relates generally to system interactions, and more particularly, to a solution for resource processing using an intermediary for context-based customization of interaction deliverables.

BACKGROUND ART

Organized software development generally follows well-defined styles that provide recognizable and repeatable structures, much like other disciplines (e.g., civil engineering, culinary arts, graphic design, etc.). Structure enables the consistent implementation of constraints to achieve specific desired properties. Three leading software architectural styles are Object Oriented Development, Service Oriented Architecture, and Representational State Transfer.

In the Object Oriented Development (OOD) style, an object is a set of dependent data and functions. Each encapsulated object is an artifact that has a custom interface providing for its manipulation. Objects can be loosely-coupled, but are not individually addressable by a remote system without extension (e.g., common object request broker architecture, CORBA). In the context of an application, object bindings are often prescribed as fixed components of the system. The use of any interaction context to customize system responses is left to the software developer in defining an object. Overall, the OOD style supports rich software applications, but the tight-coupling within, and often between objects, limits the practical range of result customization.

In the Service Oriented Architecture (SOA) style, a service is a set of dependent data and functions. Each encapsulated service is a black-box artifact that has a custom interface defining the fixed range of its manipulation. Services are loosely-coupled and can be individually addressable components in a distributed system. In the context of an application, the SOA style requires a meta application layer for messaging, translation, and binding. This layer is typically supported by discrete middleware components (e.g. enterprise service bus (ESB), business process execution language (BPEL), business process management (BPM), etc.). The use of any interaction context to customize system responses is left to the software developer in defining a service interface. Overall, the SOA style supports rich software applications, but the tight-coupling within services and the black-box nature of services intrinsically limits the practical range of result customization.

In the Representational State Transfer (REST) style, a resource is any discrete element of information (e.g. document, database record, temporal service, etc.), independent of any pre-determined function, that can be referenced with a unique address (e.g., Uniform Resource Indicator, URI). Each resource is a standalone artifact that has a standard interface (e.g., the Uniform Interface) providing for its manipulation, however manipulation is done through representations, which isolate a resource from direct interaction. Resources are loosely-coupled and addressable components in a distributed system. In the context of an application, every resource is a potential state addressable by a client, therefore each client request results in a representation and a new application state. The use of any interaction context to customize system responses is constrained to in-band context provided with the client request, the software developer is prohibited from using any out-of-band context that may reside on the server. Overall, the REST style supports rich software applications, but the absence of pre-determined functions, and the inability to use server-side context, results in a client driven application that intrinsically limits the practical range of result customization.

SUMMARY OF THE INVENTION

Aspects of the invention provide a software application, which includes work order resources, each of which defines an atomic operation for the software application, and a construction service resource, which processes the work order resources in response to all interaction requests for the software application. Each interaction request is received from a client and identifies a corresponding work order, which the construction service processes to dynamically construct a set of deliverables, which can include a custom representation of the work order. While processing the interaction request, the construction service, as directed by the work order, can make one or more requests to context resources for context information corresponding to an activity for which the interaction was requested to construct the set of deliverables. The work order resource can comprise a reflective program that enables the construction service to dynamically determine and construct the set of deliverables, including the next appropriate interaction(s) using the context information, thereby directing a set of atomic operations as part of an activity being performed and enabling the dynamic context-based construction of interaction deliverables.

A first aspect of the invention provides a software application comprising program code embodied in at least one computer-readable medium, the software application comprising: a plurality of work order resources, wherein each work order resource defines an atomic operation for the software application and has a corresponding unique work order resource identifier; a construction service resource configured to process all interaction requests for the software application, wherein each interaction request includes a work order resource identifier, and wherein each interaction request is made as part of an activity being performed using the software application, wherein the construction service resource is configured to process each interaction request by: processing a representation of a work order resource corresponding to the work order resource identifier in the interaction request, wherein the processing includes constructing a set of deliverables as directed by the representation of the work order resource and context information for an activity corresponding to the requested interaction; and providing the set of deliverables in response to the interaction request.

A second aspect of the invention provides a computer-implemented method of processing interactions for a software application, the method comprising: receiving a work order resource identifier corresponding to an interaction request at a representation of a construction service resource of the software application executing on a computer system, wherein the representation of the construction service resource processes the interaction request by: obtaining a representation of a work order resource corresponding to the work order resource identifier in response to the receiving; processing the representation of the work order resource, wherein the processing includes constructing a set of deliverables as directed by the representation of the work order resource and context information for an activity corresponding to the requested interaction; and providing the set of deliverables in response to the interaction request.

A third aspect of the invention provides a computer system including: a processing component; and a storage component, wherein the storage component includes at least one computer-readable medium comprising a software application including: a plurality of work order resources, wherein each work order resource defines an atomic operation for the software application and has a corresponding unique work order resource identifier; and a construction service resource configured to process all interaction requests for the software application, wherein each interaction request includes a work order resource identifier, and wherein each interaction request is made as part of an activity being performed using the software application, wherein the construction service resource is configured to process each interaction request by: processing a representation of a work order resource corresponding to the work order resource identifier in the interaction request, wherein the processing includes constructing a set of deliverables as directed by the representation of the work order resource and context information for an activity corresponding to the requested interaction; and providing the set of deliverables in response to the interaction request.

A fourth aspect of the invention provides a method of performing an activity, the method comprising: providing a request for an atomic operation of the activity for processing by a system controller, the request including an identifier of a work order resource defining the atomic operation, wherein the system controller is configured to provide the identifier of the work order resource to a construction service for processing; and receiving a custom representation of the work order in response to the request from the construction service.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 12A-12E show illustrative views of a grant during various portions of the lifecycle of the grant according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
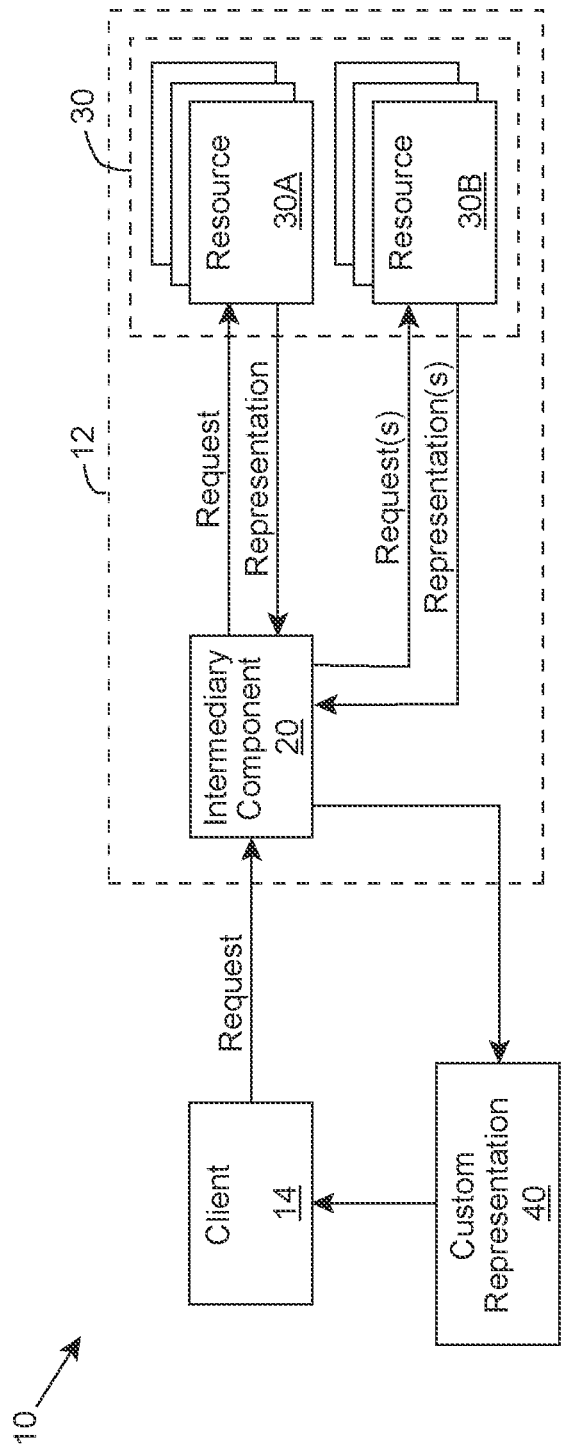
FIG. 1 shows an illustrative high level data flow diagram for performing an atomic operation using a software application according to an embodiment.

As indicated above, aspects of the invention provide a software application, which includes work order resources, each of which defines an atomic operation for the software application, and a construction service resource, which processes the work order resources in response to all interaction requests for the software application. Each interaction request is received from a client and identifies a corresponding work order, which the construction service processes to dynamically construct a set of deliverables, which can include a custom representation of the work order. While processing the interaction request, the construction service, as directed by the work order, can make one or more requests to context resources for context information corresponding to an activity for which the interaction was requested to construct the set of deliverables. The work order resource can comprise a reflective program that enables the construction service to dynamically determine and construct the set of deliverables, including the next appropriate interaction(s) using the context information, thereby directing a set of atomic operations as part of an activity being performed and enabling the dynamic context-based construction of interaction deliverables. As used herein, unless otherwise noted, the term "set" means one or more (i.e., at least one) and the phrase "any solution" means any now known or later developed solution.

An embodiment provides a software development framework for developing software applications, in which a process flow for performing an activity can be dynamically determined throughout the lifecycle of the activity based on a current context of the activity at a conclusion of each atomic operation. The atomic operation of the framework is an individual system interaction that is performed by calling a single resource, e.g., a work order resource. The framework provides an intermediary between a client requesting an atomic operation and the resource configured to perform the atomic operation. The intermediary provides a mechanism for directing the client to the next valid interactions for continuing to perform the activity based on use of context information in support of the activity.

As used herein, it is understood that the term "activity" means a set of atomic operations to accomplish a goal (e.g., form a complete business/technical process). The goal is set when the activity is initiated, but the specific atomic operation(s) that accomplish the goal can vary based on the context information corresponding to each instance of an activity to which the software application is directed. A group of related atomic operations (e.g., a compound operation) is referred to herein as a "task" (e.g., a process fragment). A task is a discrete fragment of an activity that fulfills a defined objective in furtherance of the goal (e.g., complete a form, review a form, submit a form, modify a form, and/or the like). Similar to an activity, the objective of the task is set when the activity is initiated, but the specific atomic operation(s) that accomplish the goal can vary based on the context information corresponding to the activity. It is understood that some atomic operations and/or tasks can be performed as standalone operations (e.g., report generation, basic navigation), apart from a larger task or activity. In this case, the atomic operation is a task and activity in itself or the task is an activity in itself.

The software development framework described herein enables the development of a software application that supports rich processes where client inputs (e.g., in-band request metadata) can be included as part of the context information along with useful context information from relevant server-side resources (e.g., out-of-band metadata) to drive the activity forward. To this extent, the software application can leverage an ever growing pool of context information to guide a client to the appropriate next steps, based on the particular circumstances at any given point, to accomplish the goal.

In the style described herein, the primary artifact, a resource, can comprise any discrete element of information, independent of any pre-determined function, that can be referenced with a unique address. Each resource can be a standalone artifact that has a standard interface providing for its manipulation, however, manipulation is done through representations of the resource, which isolate a resource from direct interaction. Resources are loosely-coupled and addressable components in a distributed system.

As used herein, it is understood that the term "resource" includes any discrete element that is addressable (e.g., using a unique address, such as a URI), and which can facilitate the performance of a set of activities for which a software application is configured to implement. For example, a resource can comprise a program artifact including program code that can be executed by a computer system (e.g., directly or after translation by an interpreter). Furthermore, a resource can comprise a data artifact (e.g., document, data file, database, database record, and/or the like), which stores context information relating to activity(ies) being performed by the software application, client(s) that use the software application, and/or the like. Additionally, a resource can comprise a computing resource, such as a SOA component, an external system, a temporal service, and/or the like. Each resource can be a standalone artifact that has a standard interface (e.g., the uniform interface) providing for its manipulation. However, manipulation can be done through representations of the resource, which isolate the resource from direct interaction.

In an embodiment of an application, every client request calls a system controller, and passes a unique address in the request metadata for a coarse-grained reflective program (resource), which the system controller refines with in-band and out-of-band context to provide a custom set of deliverables, which can include a custom representation of the program. The use of any interaction context to customize system responses is left to the developer who can specify relative variables that will be refined by interaction-specific context in the construction of custom sets of deliverables. Overall, applications developed using the style described herein can support dynamic interaction, with mass customization and maximum resource re-use.

An embodiment provides a software development framework as described herein, which can be implemented in any of the leading software architectural styles: OOD, SOA, or REST. A distinguishing aspect of these architectural styles, relative to such an implementation, is the nature of their primary artifact—objects, services and resources, respectively. In particular, while each of the styles can support rich software applications, their primary artifact sets the threshold for each style's granularity, which in large part determines its latent capacity for customization. In an embodiment of the invention, an implementation includes an intermediary component that processes a reflective work order, making repeated requests, as directed by the work order, for other context information to refine a work order and construct a custom set of deliverables. In a more specific embodiment of the invention, implementation uses resources for context information, as using objects or services could result in an impractical number of fine-grained artifacts with little re-usability, particularly as activities grow in breadth and complexity.

An illustrative implementation of the invention in the OOD style uses a remote object to act as the intermediary component to process a reflective work order, making repeated requests, as directed by the work order, for other context information to refine a work order and construct a custom set of deliverables. An illustrative implementation of the invention in the SOA style uses a service to act as the intermediary component to process a reflective work order, making repeated requests, as directed by the work order, for other context information to refine a work order and construct a custom set of deliverables. An illustrative implementation of the invention in the REST style uses a RESTful service to act as the intermediary component to process a reflective work order, making repeated requests, as directed by the work order, for other context information to refine a work order and construct a custom set of deliverables.

However, each implementation can use resources (which are native for the REST style) for context information, as using objects (OOD) or services (SOA) could result in an impractical number of fine-grained artifacts with little re-usability, particularly as activities grow in breadth and complexity.

As discussed herein, the software development framework includes an intermediary and resources for performing atomic operations. FIG. 1 shows an illustrative high level data flow diagram 10 for performing an atomic operation using a software application 12 according to an embodiment. Software application 12 includes an intermediary component 20 and a set of resources 30. The set of resources includes a subset of resources 30A, each of which is configured to enable intermediary component 20 to perform an atomic operation, and a subset of resources 30B that are used by intermediary component 20 while performing the atomic operation. To this extent, resources 30A are only indirectly referenced by clients 14, and resources 30B are not explicitly referenced by clients 14.

As illustrated, a client 14 generates a request to perform an atomic operation and sends the request for processing by the intermediary component 20. The request includes an identifier indicating the resource 30A required to perform the atomic operation, e.g., a work order resource described herein. In performing the atomic operation, the intermediary component 20 requests a representation of the identified resource 30A and processes the representation of the identified resource 30A.

When processing the identified resource 30A, intermediary component 20 can make one or more requests to other resources 30B of the software application 12 and receive a representation of the requested resource 30B in response to each request. Once processing of the identified resource 30A is complete, the intermediary component 20 constructs (e.g., performs, provides, and/or the like) all deliverables prescribed as a result of processing the identified resource 30A, which can include providing a custom representation 40 of the identified resource 30A for processing by the client 14. Client 14 can perform an activity using software application 12 by requesting a series of atomic operations, each of which is performed by software application 12, which provides a corresponding custom representation 40 at the end of performing the activity. To this extent, each custom representation 40 can include a set of identifiers, each of which corresponds to a resource 30A configured to implement the next valid atomic operation for the activity.

Resources 30 are loosely-coupled and addressable components in a distributed system. Resources 30 can be located anywhere in a computer system executing application 12. For example the computer system can comprise an application server or the like, which executes both intermediary component 20 and includes one or more resources 30 stored thereon. Additionally, one or more resources 30 can be stored on another server, which can communicate with the application server executing intermediary component 20 over any combination of one or more of any type of public and/or private networks.

In an embodiment, each request received from client 14 and transmitted by intermediary component 20 during implementation of the requested interaction uses a standard interface protocol. As used herein, "standard interface protocol" means a specification including a set of rules for multiple computing components to communicate with one another, which is used throughout all interactions between the components of application 12 and between application 12 and client 14. In an embodiment, the standard interface protocol comprises a protocol that is widely implemented on computer systems. An illustrative standard interface protocol comprises a uniform resource identifier (URI) scheme, such as hypertext transfer protocol (HTTP). However, it is understood that, depending on the hardware implementation of application 12, the standard interface protocol is not necessarily a communications protocol. For example, the standard interface protocol can comprise an application programming interface (API) for an operating system of a computing device executing application 12.

In general, a request received by intermediary component 20 identifies a resource 30A that intermediary component 20 processes (e.g., executes) to construct deliverables, including constructing and providing a custom representation of the resource 40 for processing by client 14. In an embodiment, the custom representation of the resource 40 comprises a dynamically generated artifact that can be processed by a web browser executing on client 14, such as a hypertext markup language (HTML) document, a Java applet, an ActiveX control, or the like. Regardless, the custom representation of the resource 40 can include content that is dynamically included based on a context of the activity corresponding to the request. Further, the custom representation of the resource 40 can include a set of identifiers corresponding to the next valid atomic operation for the activity that is dynamically determined based on a context of the activity.

In an embodiment, an identified resource 30A comprises a reflective program. As used herein, a reflective program comprises a resource 30 that describes the conditions for its own execution. In this case, the resource 30A allows variance in the resulting custom set of deliverables, such as a representation of the resource 40. For example, resource 30A can direct intermediary 20 to evaluate a set of conditions based on the context of the activity to determine which of a plurality of possible sets of actions the intermediary 20 will perform. Additionally, while performing a set of actions, the intermediary 20 can construct a custom set of deliverables, which can include a custom representation of the resource 40, using the context of the activity as directed by the resource 30A.

Figure 2:
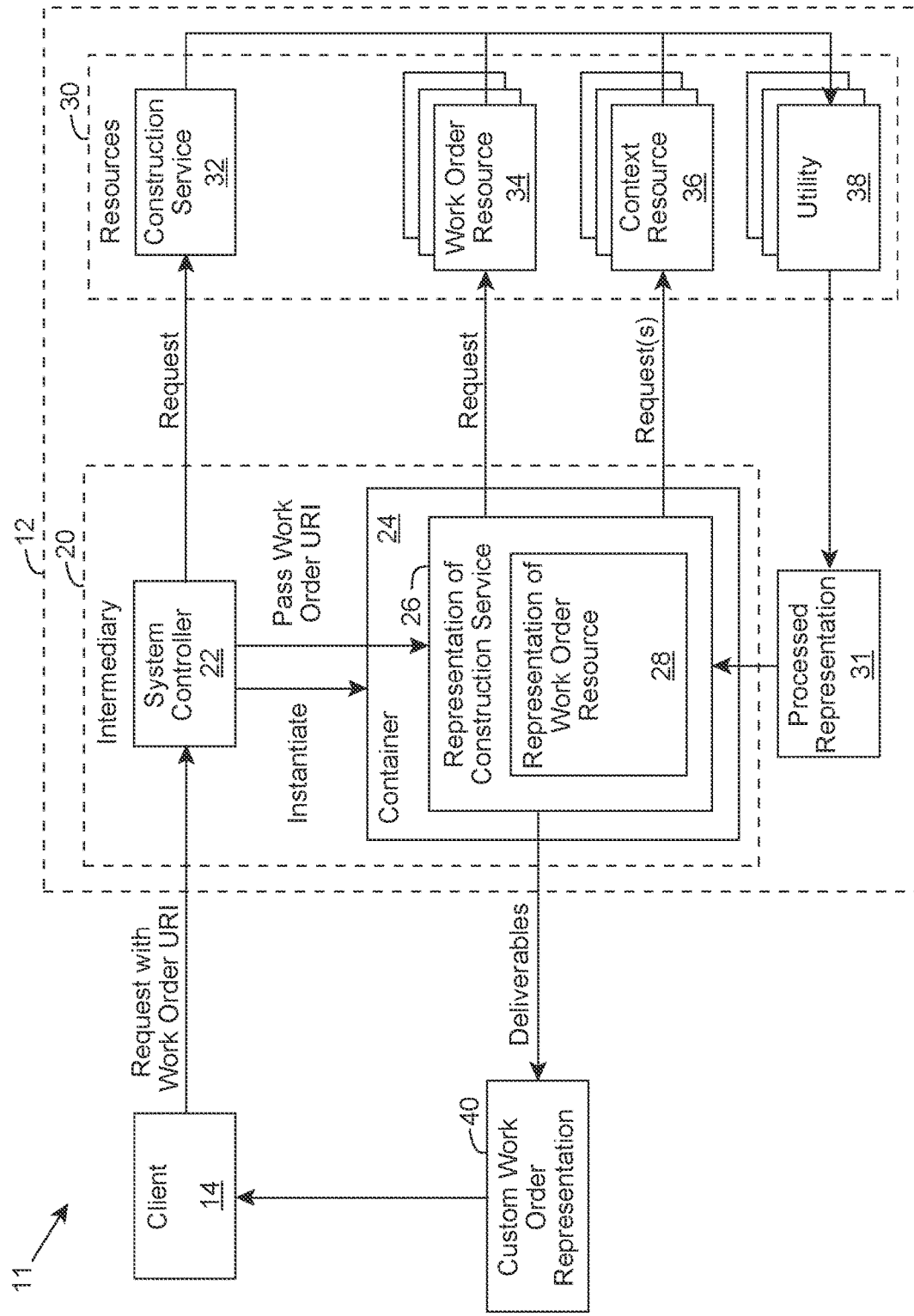
FIG. 2 shows a more detailed illustrative data flow diagram for performing an atomic operation using the software application of FIG. 1 according to an embodiment.

FIG. 2 shows a more detailed illustrative data flow diagram 11 for performing an atomic operation using the software application 12 of FIG. 1 according to an embodiment. As illustrated, client 14 sends a request including a URI for a work order resource 34, which is configured to enable intermediary 20 to perform the atomic operation. Each request generated by client 14 in executing the software application 12 is a request for an atomic operation, and is addressed to a system controller 22 of the intermediary 20 (e.g., using a URI for the system controller 22). Intermediary 20 is shown including a single system controller 22, which is configured to receive all requests from the various clients 14. However, it is understood that multiple system controllers 22 can be implemented at the same URI, thereby enabling the software application 12 to be scaled.

Figure 3:
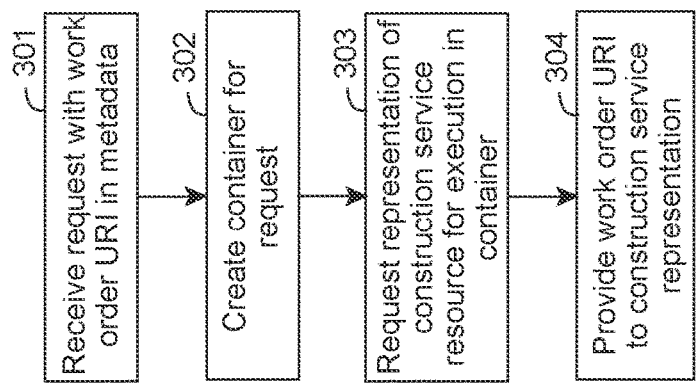
FIG. 3 shows an illustrative method of pre-processing a request using the application of FIG. 2 according to an embodiment.

In any event, system controller 22 performs pre-processing of the request. To this extent, FIG. 3 shows an illustrative method of pre-processing a request, which can be implemented by system controller 22, according to an embodiment. Referring to FIGS. 2 and 3, in action 301, system controller 22 receives the request, which was generated by a client 14. As is understood, the request includes in-band metadata about client 14, and further includes the URI for a work order resource 34 in the in-band metadata, e.g., within the header information of a client request, or the like.

In response to receiving the request, in action 302, system controller 22 instantiates a container 24 for processing the request. Container 24 comprises a software component that holds other software components. In action 303, system controller 22 requests a representation of a construction service resource 32 for execution in the container 24 in order to process the request. Resources 30 include a single construction service resource 32, which can be implemented using any type of standard programming language, e.g., Java, .NET, or the like. To this extent, for every atomic operation performed by application 12, a representation of the same construction service resource 32 is utilized to process the request as discussed herein. In action 304, system controller 22 provides the work order URI to the representation of the construction service resource 26 in the container 24. At this point, the pre-processing of the request by system controller 22 is complete, and further processing of the request is performed by the representation of the construction service resource 26 (also referred to as construction service 26) executing within the container 24.

Figure 4:
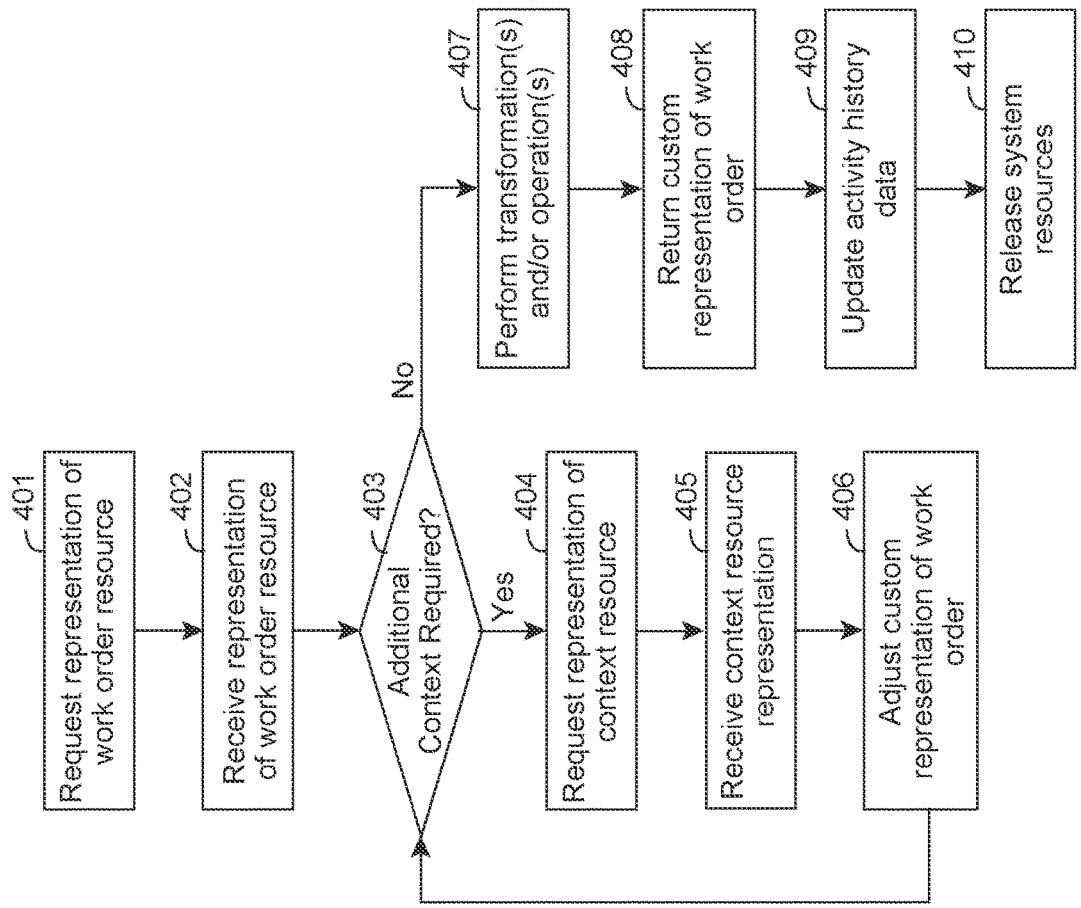
FIG. 4 shows an illustrative method of processing a request using the application of FIG. 2 according to an embodiment.

FIG. 4 shows an illustrative method of processing a request, which can be implemented by the construction service 26 executing within container 24, according to an embodiment. Referring to FIGS. 2 and 4, in action 401, construction service 26 requests a representation of the work order resource 34 for processing the atomic operation, e.g., using the work order URI included in the original request generated by client 14. As illustrated, resources 30 can include multiple work order resources 34. In an embodiment, a work order resource 34 is a program, which is configured to direct construction service 26 in performing a unique atomic operation that can be requested by clients 14 of the software application 12. Work order resources 34 can be implemented using any type of standard data format, such as XML, Java, or the like.

In an embodiment, one or more work order resources 34 comprises a course-grained resource, which is under-specified, thereby allowing a developer to set variables that will influence how the work order resource is refined. Such under-specification provides generality to the work order resource 34, increasing its potential as a reusable resource. For example, a work order resource 34 can comprise a reflective program that uses the context of an activity to determine the exact instructions for its refinement into an interaction-specific response. A course-grained work order resource 34 can reference (absolute or relative) context resource(s) 36 corresponding to variable(s) identifying the type of deliverable(s) required to be provided in response to the request. Additionally, the work order resource 34 can reference context resource(s) 36 corresponding to variable(s) for customizing the construction of the set of deliverables, including the next interaction request(s) that are valid for the client 14 to request in the context of the activity. Through the processing of these variables, the construction service 26 can construct custom sets of deliverables while providing a developer a practical mechanism for prescribing variance.

In action 402, construction service 26 receives a representation of the work order resource 28 (also referred to as work order 28) and begins processing the work order 28. Depending on the atomic operation being performed, the construction service 26 performs one or more operations (e.g., update, delete, read, and/or the like), transformations (e.g., calculations), or the like, as directed by the work order 28, on application data (resource(s) 30) corresponding to the activity for which the atomic operation is being performed and construct a custom set of deliverables, which can include a custom representation of the work order 40, in response to the request.

As discussed herein, the work order 28 can reference context information to refine and make absolute relative references, to obtain explicit guidance that dynamically adjusts its processing by construction service 26. The context information can include in-band information, such as metadata regarding the activity that is included with the request received from the client 14. In addition to the work order URI, the in-band information can include client data corresponding to the client 14, such as an identification of the client 14, authentication information, data provided by the client 14 (e.g., entered in a form), and/or the like. The context information can include out-of-band information. The out-of-band information can comprise metadata regarding the activity that is not included with the request received from the client 14. Construction service 26 can use the in-band context information to acquire the out-of-band context information as directed by the work order 28. Additionally, construction service 26 can use out-of-band context information already acquired to acquire additional out-of-band context information as directed by the work order 28.

To this extent, in action 403, construction service 26 can determine whether any additional context information is required to execute the work order 28. If so, in activity 404, construction service 26 can request, as directed by the work order 28, a representation of a context resource 36, e.g., using a context resource URI included in work order 28. The context resource 36 can comprise a fine-grained resource, which is an explicit component, such as a data entity, document, and/or the like, or a course-grained resource, which itself requires additional context information. Regardless, in activity 405, construction service 26 can receive a representation of the context resource 36, and in activity 406, construction service 26 can advance the construction of a custom set of deliverables according to the work order 28 and the context information. Actions 404, 405, 406, can be repeated any number of times, until all context information has been processed by construction service 26 as defined by the work order 28.

Once construction service 26 has completed processing the work order 28, construction service 26 can construct (e.g., perform, provide, and/or the like) all deliverables prescribed as a result of processing the work order 28. In an embodiment, the set of deliverables can result in any combination of one or more of: a user interface modification for a human client 14 with one or more work order identifiers, data delivery for a machine client 14 with one or more work order identifiers, modification to one or more resources 30, and/or the like. To this extent, in action 407, construction service 26 can perform one or more transformations and/or operations on one or more resources 30, if any. Illustrative transformations/operations on resources 30 include updating/modifying a resource 30 (e.g., a data resource), adding a resource 30, changing a state of a resource 30, add/remove a tag on a resource 30, create/delete a resource 30, send local and/or remote messages, and/or the like. Additionally, in action 408, construction service 26 can provide the custom representation of the work order 40 for processing by the client 14. Furthermore, in action 409, construction service can perform updates to activity history data (a particular type of context resource 36) for the corresponding activity. For example, the activity history data can include an indication of the time when the atomic operation was completed, version information for the various resources 30 utilized in completing the atomic operation, and/or the like. When the atomic operation is performed as part of a task, the construction service 26 can update task-specific history data in the activity history data. In action 410, construction service 26 and container 24 can terminate, thereby releasing the system resources of a computer system processing the atomic operation.

As illustrated in FIG. 2, when a resource 30 is requested, a utility 38 can process the resource before providing the requester, e.g., construction service 26, with a processed representation of the resource 31. To this extent, a resource 30 can include a resource utility type, which provides a machine-readable mapping between the resource type of the resource 30 and a utility 38 configured for processing resources 30 of the corresponding resource type. In an embodiment, the format used for the resource utility type is standard across all resources 30 of the application 12. For example, the resource utility type can comprise a tag indicating the utility capable of processing the resource 30. Regardless, when construction service 26 requests a resource 30, an unprocessed representation of the resource 30 is provided to the utility 38, which processes the representation of the resource 30 to generate the processed representation of the resource 31. Illustrative utilities 38 include a XML parser, a rules engine, a workflow engine, a reporting engine, an indexing engine, and/or the like.

While the utilities 38 are shown conceptually as being part of the resources 30 of an application 12, it is understood that one or more utilities 38 can be separately implemented and managed as remote resources 30 apart from the remaining resources 30 of the application 12. In this case, the utilities 38 would not form a part of application 12, but would comprise a remote/separate computing component (similar to the computing hardware and operating system) that is utilized by application 12. Similarly, other resources 30, such as context resources 36 can be separately implemented and managed as remote resources 30 apart from the remaining resources 30 of the application 12. For example, a context resource 36 can comprise a legacy system, which is encapsulated as references for resources 30, updated by construction service 26 as part of an operation (e.g., via a uniform interface, such as an API), and/or the like.

Figure 5:
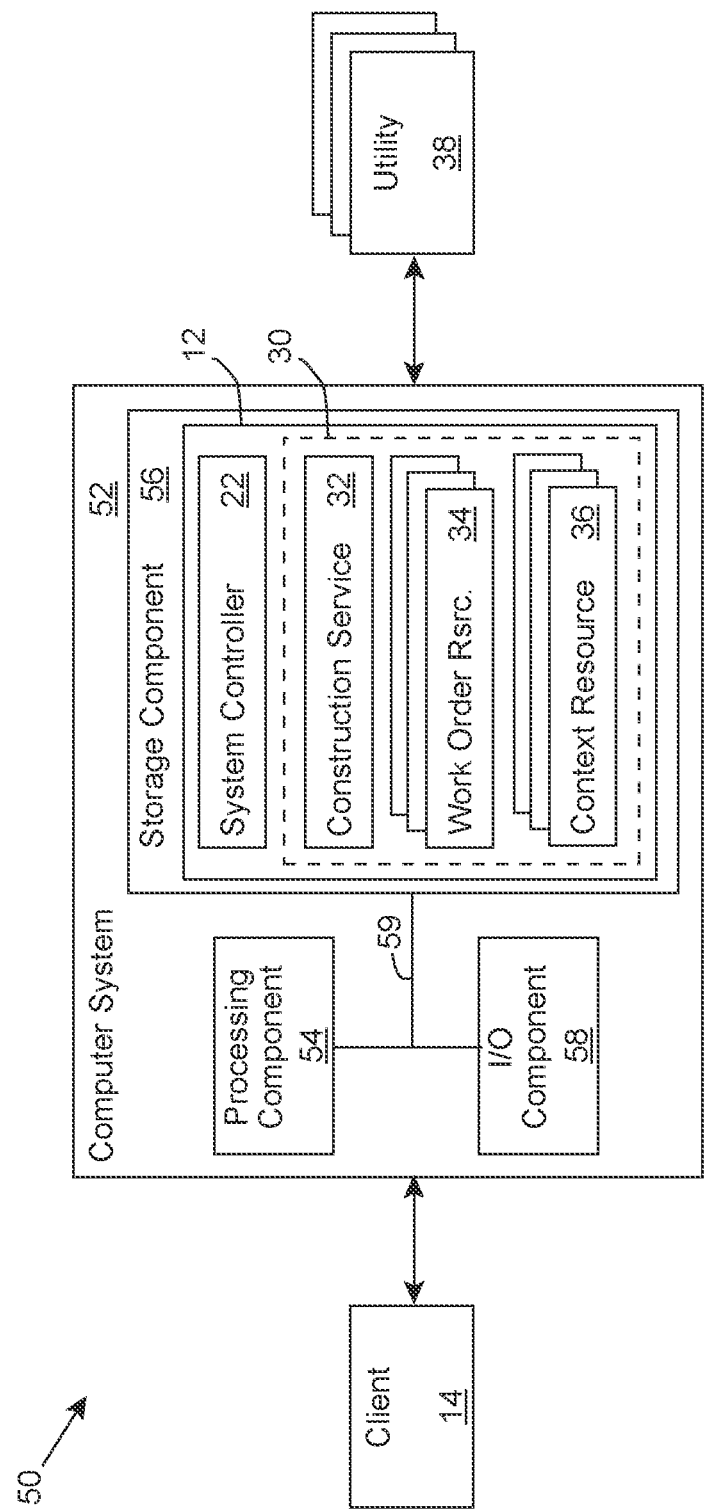
FIG. 5 shows an illustrative environment for executing the application of FIG. 2 in order to perform a task according to an embodiment.

As discussed herein, application 12 can be executed by any type of computer system. FIG. 5 shows an illustrative environment 50 for executing application 12 (FIG. 2) in order to perform an activity according to an embodiment. To this extent, environment 50 includes a computer system 52 that can perform a process described herein in order to execute each atomic operation of the activity. In particular, computer system 52 is shown including application 12, which makes computer system 52 operable to perform an activity as described herein.

Computer system 52 is shown including a processing component 54 (e.g., one or more processors), a storage component 56 (e.g., a storage hierarchy), an input/output (I/O) component 58 (e.g., one or more I/O interfaces and/or devices), and a communications pathway 59. In general, processing component 54 executes program code, such as system controller 22 and/or representations of one or more resources 30 of application 12, which is at least partially fixed in storage component 56. While executing program code, processing component 54 can process data, which can result in reading and/or writing transformed data from/to storage component 56 and/or I/O component 58 for further processing. Pathway 59 provides a communications link between each of the components in computer system 52. I/O component 58 can comprise one or more human I/O devices, which enable a human client 14 to interact with computer system 52 and/or one or more communications devices to enable a system client 14 to communicate with computer system 52 using any type of communications link. To this extent, computer system 52 can manage a set of interfaces (e.g., graphical user interface(s), application program interface, and/or the like) that enable human and/or system clients 14 to interact with application 12. Further, application 12 can manage (e.g., store, retrieve, create, manipulate, organize, present, etc.) the data, such as resources 30, using any data management solution.

In any event, computer system 52 can comprise one or more general purpose computing articles of manufacture (e.g., computing devices) capable of executing program code, such as system controller 22, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, application 12 can be embodied as any combination of system software and/or application software.

As discussed herein, application 12 can be implemented using a set of resources 30. In this case, a resource 30 can enable computer system 52 to execute a set of actions used by application 12 to perform an activity. Resources 30 can be separately developed and/or implemented remote from other portions of application 12. For example, utility 38 resources are shown implemented remote from the remaining types of resources, e.g., construction service 32, work order resource(s) 34, and context resources 36, of application 12. However, it is understood that other types of resources 30, such as context resources 36, can be separately developed and/or implemented. Furthermore, it is understood that environment 50 can include a mix of context resources 36 and/or utility resources 38 that are both a part of application 12 and remote from application 12.

As used herein, the term "component" means any configuration of hardware, with or without software, which implements the functionality described in conjunction therewith using any solution. The term "module" means program code that enables a computer system 52 to implement the functionality described in conjunction therewith using any solution, and refers to system controller 22 and program artifacts of resources 30. When fixed in a storage component 56 of a computer system 52 that includes a processing component 54, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of computer system 52.

When computer system 52 comprises multiple computing devices, each computing device can have only a portion of application 12 fixed thereon (e.g., one or more resources 30). However, it is understood that computer system 52 and application 12 are only representative of various possible equivalent computer systems that may perform a process described herein. To this extent, in other embodiments, the functionality provided by computer system 52 and application 12 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 52 includes multiple computing devices, the computing devices can communicate over any type of communications link. Further, while performing a process described herein, computer system 52 can communicate with one or more other computer systems using any type of communications link. In either case, the communications link can comprise any combination of various types of wired and/or wireless links; comprise any combination of one or more types of networks; and/or utilize any combination of various types of transmission techniques and protocols. In an embodiment, computer system 52 comprises an application server, which communicates with clients 14 over the Internet.

Figure 6:
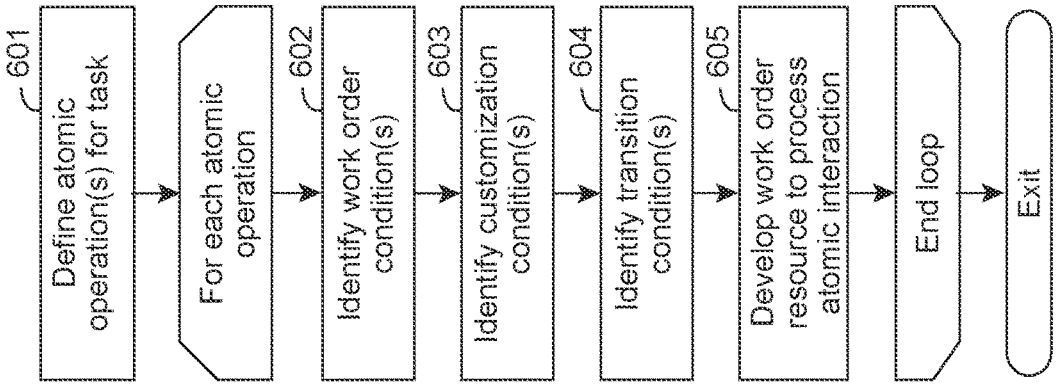
FIG. 6 shows an illustrative software development method for developing the software application of FIG. 1 according to an embodiment.

In an embodiment, a method of developing a software application using the software development framework is provided. To this extent, FIG. 6 shows an illustrative software development method according to an embodiment. In action 601, a developer defines a set of atomic operations for performing a task (or activity). Each atomic operation may or may not be required when performing the task. The atomic operation can be defined from the perspective of the client. In this case, the atomic operation is all processing performed in response to a single request from the client. For example, an illustrative task can comprise the creation of a new form, and the atomic operations can include: create new, develop form, validate form, and submit.

For each atomic operation, the developer can identify the context information for the activity (or task) that is required in order to perform the atomic operation, and will be acquired when processing the corresponding work order resource. To this extent, in action 602, the developer identifies zero or more work order condition resources (e.g., context resources). Each work order condition resource can comprise context information for the activity that can alter the actions identified by a work order to implement the atomic operation depending on the data corresponding to the work order condition resource. For example, illustrative work order condition resources include: a type of client, a status of related activity(ies), a personnel profile, a domain rule, a rate schedule, an activity record, and/or the like.

In action 603, the developer identifies zero or more customization condition resources (e.g., context resources). Each customization condition resource can comprise context information for the activity that can alter one or more aspects of the resulting custom set of deliverables. For example, illustrative customization condition resources include: privileges of a requesting client, attributes/preferences of the requesting client (e.g., preferred color scheme, type of display device, etc.), a personnel profile, a domain rule, a rate schedule, a style sheet, an activity record, and/or the like.

In action 604, the developer identifies zero or more transition condition resources (e.g., context resources). Each transition condition resource can comprise context information for the activity that can dictate the next atomic operation(s) that is valid for the activity (e.g., a combination of one or more forms/rules, a particular review/approval route, user initiated interaction(s), and/or the like). For example, illustrative transition condition resources include: client inputs, personnel profile, a status of a related activity, and/or the like.

In action 605, the developer develops a work order resource to process the atomic operation. In particular, construction service 26 can execute the resulting work order resource to perform the atomic operation by: determining a set of actions to perform, e.g., based on data corresponding to the work order conditions, if any; performing the set of actions, e.g., using data corresponding to the customization conditions, if any; and including a mechanism for enabling the client to select one of a set of valid next interactions for the activity, e.g., using data corresponding to transition conditions, if any. In an embodiment, the mechanism is a distinct work order URI corresponding to a work order that is configured to perform each of the set of valid next interactions.

It is understood that the illustrative software development method shown and described herein is only exemplary of the process for developing a work order program. To this extent, one or more of the actions in the method can be removed, the order of the actions can be changed, multiple iterations of one or more of the actions can be performed, and/or the like. Regardless, the method, or variations thereof, can be repeated for each task and/or activity for which the resulting software application is to be used to perform. In this manner, the software application can be developed in a bottom-up manner.

As described herein, the software application developed using the software development framework described herein can be highly flexible in its performance of an activity. For example, as discussed herein, some or all of the work order resources 34 (FIG. 2) can be developed as coarse-grained resources, which can determine what actions to perform, content to include, and/or next operation(s) to perform at runtime using context information for the activity.

Additionally, while execution of the software application has primarily been shown and described as completing an activity by performing a series of atomic operations, it is understood that a group of related atomic operations can be defined as a task, which is performed as part of an activity. In this case, context data corresponding to a task, which is a subset of the context data for the activity, can be used by the work order resources 34 that implement the atomic operations.

Figure 7:
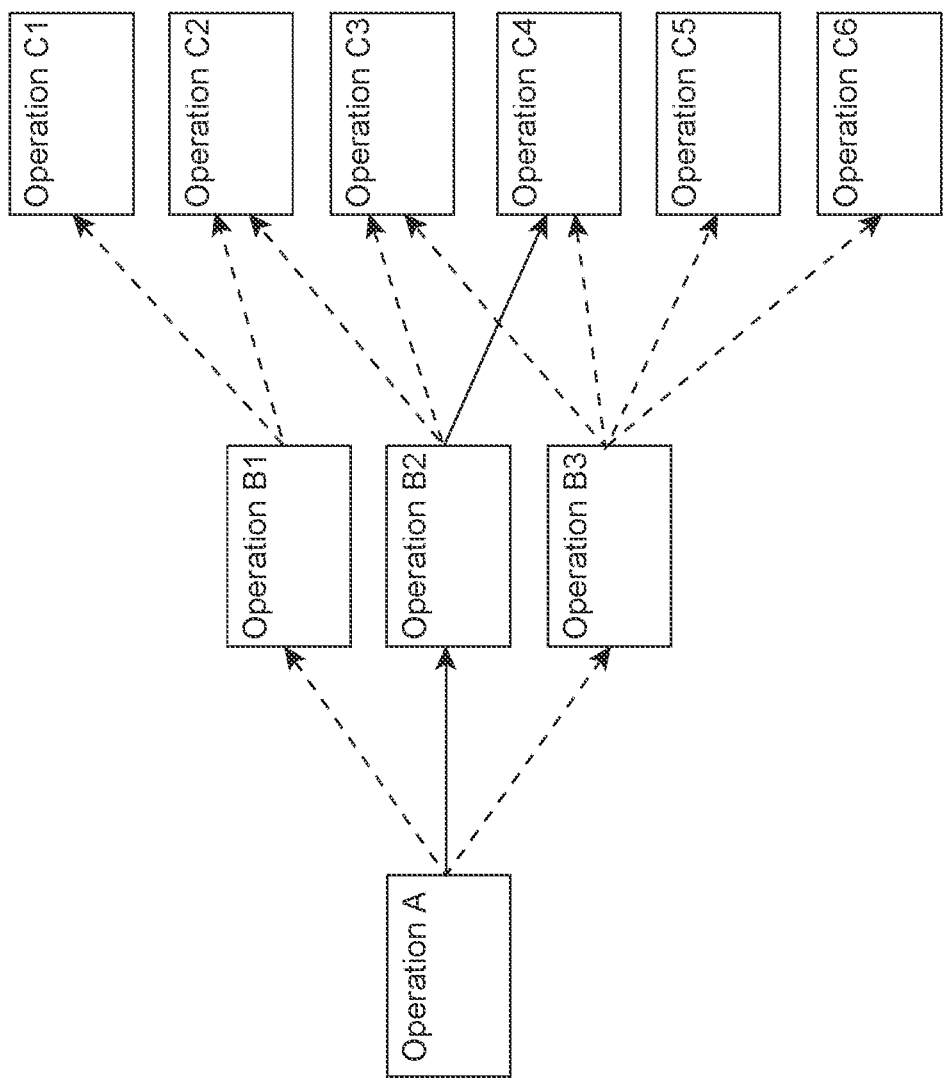
FIG. 7 shows an illustrative flow diagram for performing a task using the software application of FIG. 1 according to an embodiment.

To this extent, FIG. 7 shows an illustrative flow diagram for performing a task according to an embodiment. As illustrated, the task includes three operations. However, when performing Operation A, the construction service 26 can use the corresponding work order resource 34 to dynamically determine which of three possible Operations B1, B2, B3, is the appropriate next operation based on context information for the task/activity. Similarly, depending on the second Operation B1, B2, or B3, which is performed for the task, construction service 36 can dynamically determine one or more third Operations C1-C6 to be the appropriate next operation based on context information for the task/activity. Each of the various operations can comprise an atomic operation or a compound operation (e.g., another task).

In performing the illustrative task, Operation A was performed followed by Operation B2, followed by Operation C4 as denoted by the solid arrows. A flow diagram of a particular performance of a task can be recreated (e.g., using history data), and would include a series of Operations A, B2, C4. However, this is only one of nine potential combinations of operations that could have been performed to complete the task for the activity as denoted by the dashed arrows. It is understood that when determining the next operation for the activity, multiple operations may be equally valid. In this case, the custom representation returned to the client can enable the client to select the next operation from the multiple valid operations.

Figure 8:
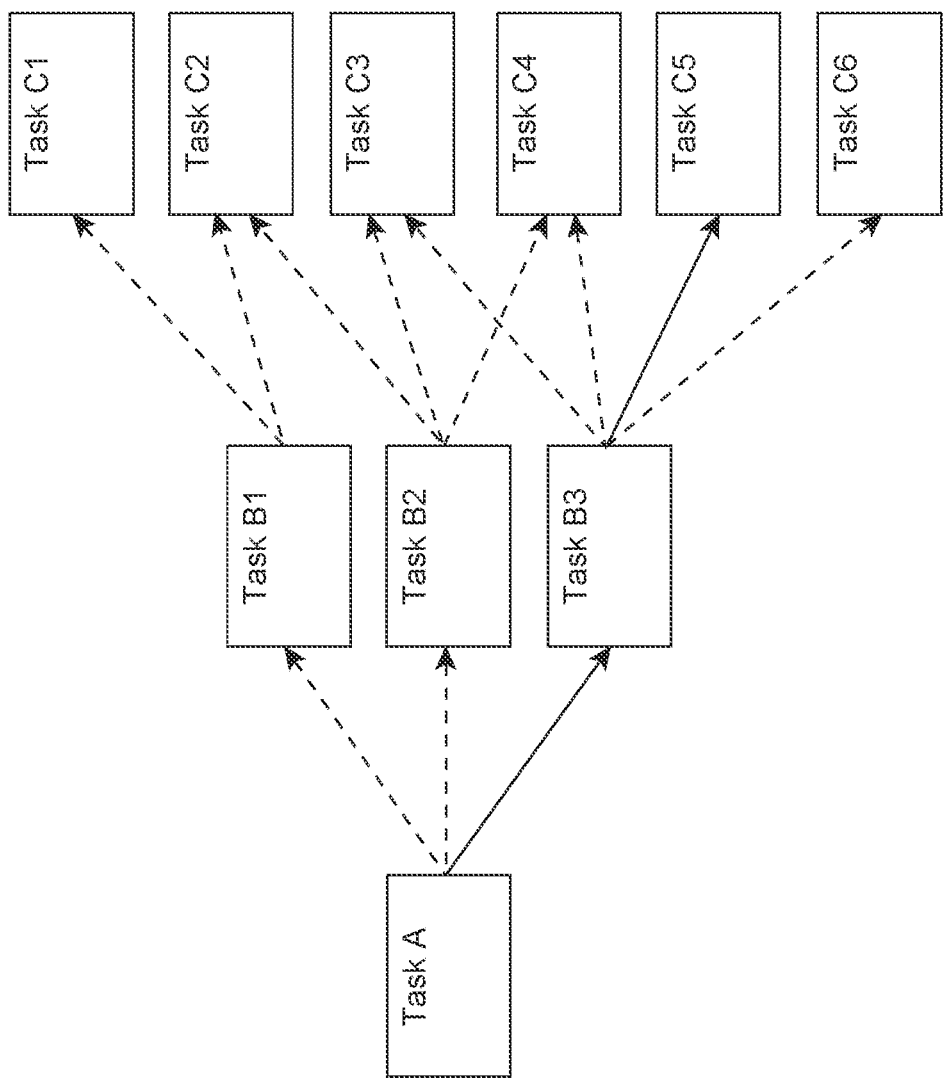
FIG. 8 shows an illustrative flow diagram for performing an activity using the software application of FIG. 1 according to an embodiment.

As described herein, multiple tasks (and/or atomic operations) can be chained together to perform an activity. To this extent, FIG. 8 shows an illustrative flow diagram for performing an activity according to an embodiment. As illustrated, similar to performing a task, the activity can include multiple possible tasks (or operations) at the conclusion of a previous task. When the previous task completes, the valid next task(s) is (are) dynamically determined based on context information for the activity. In this manner, application 12 can manage the performance of an activity having any arbitrary level of complexity, without the need to define a process flow to address all possible conditions.

Figure 9:
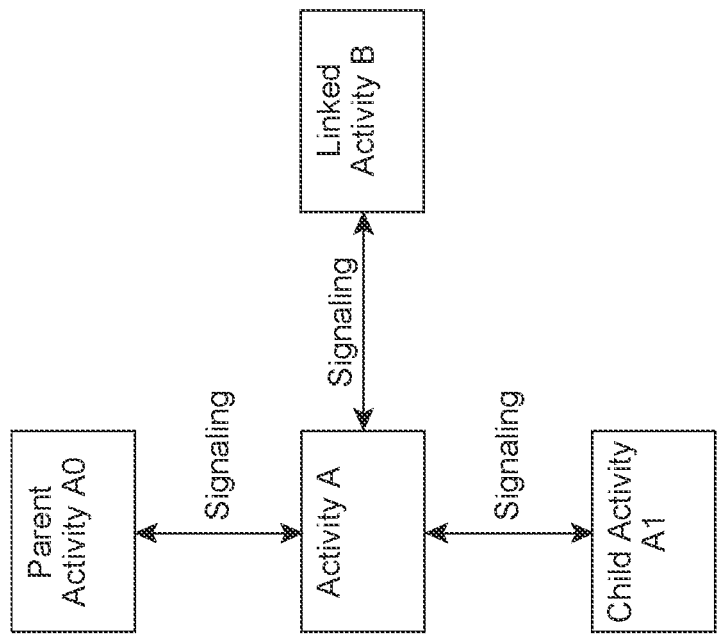
FIG. 9 shows illustrative activity relationships between activities being performed using the software application of FIG. 1 according to an embodiment.

Additionally, activities performed using the application can be related. To this extent, FIG. 9 shows illustrative activity relationships between activities being performed using the application according to an embodiment. As illustrated, an activity, such as Activity A, can comprise zero or more related and independent linked activities, such as Linked Activity B, and/or zero or more related and dependent activities, such as Parent Activity A0 and Child Activity A1. Similarly, Linked Activity B, Parent Activity A0, and/or Child Activity A1 can comprise other linked, parent, and/or child activities. Related activities (e.g., by linking or parent-child relationship) can signal one another in response to and/or as part of completing a respective task or operation. The signals can exchange information between the related activities, such as context information, which can result in a context of the related activity being changed. An activity can actively or passively monitor another activity, e.g., by polling another activity for information, registering for types of messages to be sent by the other activity, and/or the like.

In an embodiment, an application can manage related activities using a virtual folder referred to as a "case" to bring order to complex activity interrelationships. The case can be a composed resource with a status (e.g., case open, case active, case closed, and/or the like). The case can inherit the dynamic properties of its constituent parts (e.g., activities comprised of tasks that are comprised of atomic operations) and as a result, provides for adaptive case management in support of highly complex activities.

Returning to FIG. 1, in an embodiment, application 12 can comprise an extension of the REST software architecture style. In particular, application 12 inserts an intermediary component 20 between the client 14 and resources 30. In this manner, the locus of control is shifted from the client 14, as is the case in REST, to the intermediary component 20, which can use context information to direct the client 14 to required or recommended resources 30 in order to perform an activity.

In particular, in response to an interaction request received from a client 14, the intermediary component 20 can construct an interaction from a coarse-grained resource (e.g., work order resource) that specifies context conditions for its own refinement. The coarse-grained resource can vary the action(s) to be performed by intermediary component 20, attribute(s) of the data in the response, the next operation(s) to be performed as part of the task/activity, and/or the like, based on the context information. As a result, the set of deliverables, such as the custom representation of the resource 40, provided in response to the request can be an interaction-specific representation of the coarse-grained resource. The intermediary component 20 serves as a transactional framework for atomic operations, tasks (which can include multiple operations), and activities, which can include multiple tasks and/or operations.

By building an activity up from the interactions (e.g., atomic operations), the activity can inherit the dynamic properties of the interaction-level implementation, thereby providing a substantial degree of flexibility, which can enable the application to support difficult process use cases that require such flexibility. In particular, different performances of a particular activity can vary from one another at the atomic-operation level, depending on the context information for each performance of the activity.

In contrast to the REST architecture, an embodiment of the software development framework described herein utilizes a server-side intermediary component 20 to manage and exploit context (e.g., state) information for the interactions between the client 14 and the application 12. In the REST architecture, interactions between a client and a server are stateless from the perspective of the server, with any context information being managed at the client-side. Additionally, since all custom representations of resources 40 can be dynamically generated and customized for the requesting client 14, client-side caching of responses from application 12 may not be successfully utilized in the software framework described herein.

An embodiment of the software development framework described herein shifts some of the client-side processing performed in the REST architecture to the server in order to enrich the system interactions. However, the software framework enables the server side to be highly tuned in processing interactions (since all interactions are processed in the same manner), can be implemented without the need for middleware to handle messaging or the like, can be distributed to take advantage of load balancing and the like, etc. Further, since the REST architecture was first proposed, the processing and communications capabilities of networked computer systems has increased substantially thereby alleviating some of the potential adverse impact of such a shift.

The development of an application that uses the single method described herein to implement all interactions can provide several technical advantages over previous approaches. These technical advantages can include one or more of: a common programming model for application development; well-defined system constraints for locality of testing; storage of all operations as loosely-coupled resources in a secure and portable file-server; provision of an intermediary for centrality of security with no direct client access to system resources; encapsulation of legacy systems for loosely-coupled inter-operability; incorporation of new utilities that expand system capabilities; and streamlined substitution of implementation technologies.

Figure 10:
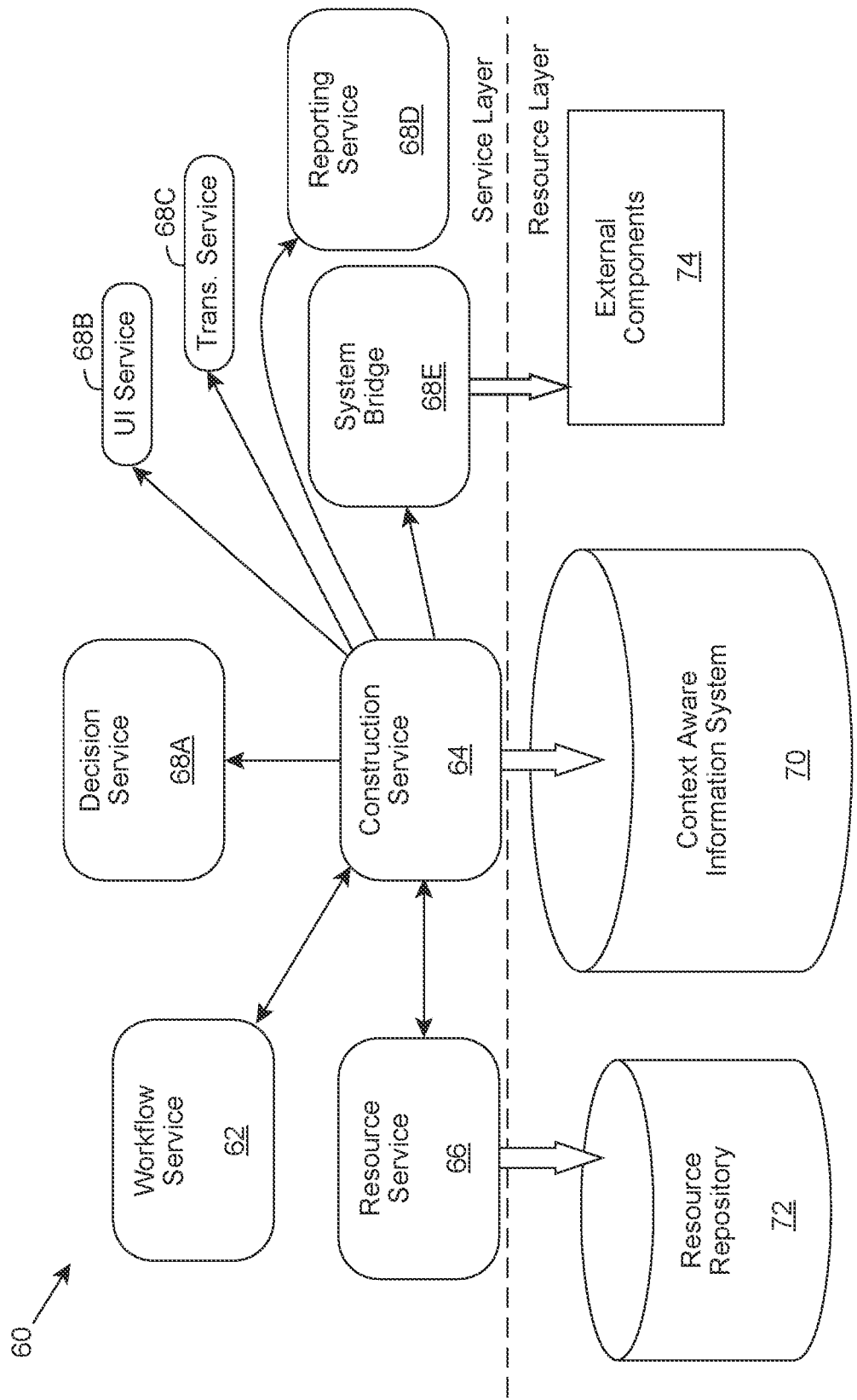
FIG. 10 shows a conceptual architecture of an illustrative SOA-style implementation of the software application of FIG. 1 according to an embodiment.

FIG. 10 shows a conceptual architecture 60 of an illustrative SOA-style implementation of the software application 12 (FIG. 1) according to an embodiment. In architecture 60, the application includes a service layer and a resource layer. The service layer includes a workflow service 62, which includes a workflow engine (e.g., system controller 22 of FIG. 2), which manages the workflow of the application 12. The workflow service 62 utilizes the construction service 64 (e.g., construction service resource 32 of FIG. 2) for each workflow step. The construction service 64 caries out work orders by resolving context using a context aware information system (CAIS) 70 and by calling other services. CAIS 70 can include various context data, such as user profiles (e.g., login, email, permissions, history, and/or the like), process history, a registry of available services (e.g., location, language/semantics, etc.), a registry of available resources (e.g., pointer, type, version, security, etc.), organization information (e.g., policies, structure/hierarchy, etc.), entity data, and/or the like.

Construction service 64 uses a resource service 66 to retrieve rules, tasks, work orders, and/or the like. Resource service 66 controls and facilitates access to the resources stored in a resource repository 72. Resource repository 72 can include various types of resources including work orders, rule definitions, service specifications, transforms, script code, tasks, and/or the like. While carrying out the work orders, construction service 64 can utilize zero or more other services. These services can include: a decision service 68A, which includes a decision engine; a user interface service 68B; a transformation service 68C; and a reporting service 68D (e.g., a third party business intelligence utility). Additionally, construction service 64 can use a system bridge 68E, which provides access to external components 74. External components 74 can include other services, e.g., implemented as a web service, external data, and/or the like.

In architecture 60, the end node of an operation/task includes a work order (e.g., a parameterized program with a set of declarative if-then-else statements) that describes different outcomes based on different context. When the end node is reached, workflow service 62 triggers the construction service 64 to process the work order. The construction service 64 retrieves the work order from resource repository 72 using resource service 66, and obtains context information for the task/activity from CAIS 70. The context is mapped to an applicable outcome indicating the next step, e.g., another process/task, using the work order. Construction service 64 can retrieve the next process/task, and provide it to workflow service 62, and performance of the activity by the application continues.

As discussed herein, application 12 (FIG. 1) can be configured to perform any group of activities comparable to, and in many cases, exceeding the capabilities of existing business process management technologies. For example, an embodiment of application 12 is configured to assist in managing research projects for an enterprise (e.g., grants management, protocol management, conflict of interest management, and/or the like). In this case, management of the lifecycle of each grant comprises an activity, which is performed using application 12. In an embodiment, the activity includes several distinct objectives, each of which is fulfilled by a unique task, one or more of which will be performed using application 12. Each task can include a set of atomic operations, each of which is fulfilled by a work order resource, one or more of which will be executed using application 12.

FIGS. 11A-11M show illustrative flowcharts for an illustrative set of tasks for managing the lifecycle of a grant according to an embodiment. Each action of the flowcharts can be fulfilled by executing a work order resource 34 (FIG. 2) using construction service 26 (FIG. 2) of application 12 (FIG. 2). In each action, context information for the grant (e.g., protocols, institutional rules, and/or the like) can be used to refine the actions performed and dynamically construct a set of deliverables. As shown and described herein, the client 14 (FIG. 2) of the application 12 is a human user, which is interacting with the application 12 via customized user interface representations of the work order resources 34.

Figure 11B:
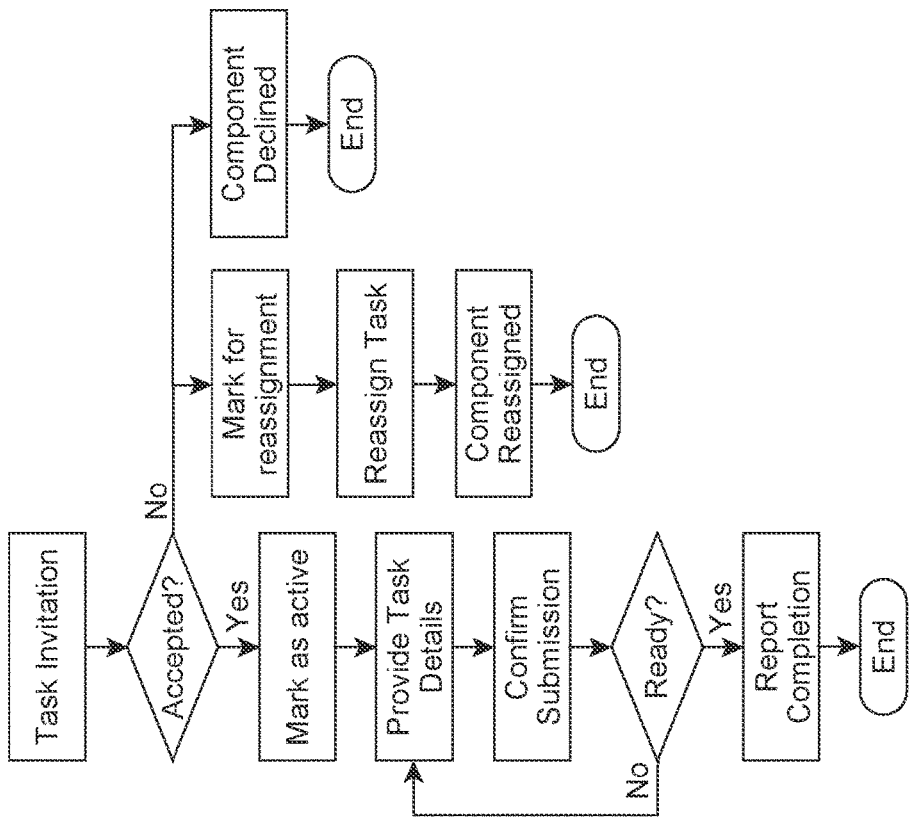
FIGS. 11A-11M show illustrative flowcharts for an illustrative set of tasks for managing the lifecycle of a grant according to an embodiment.
Figure 11A:
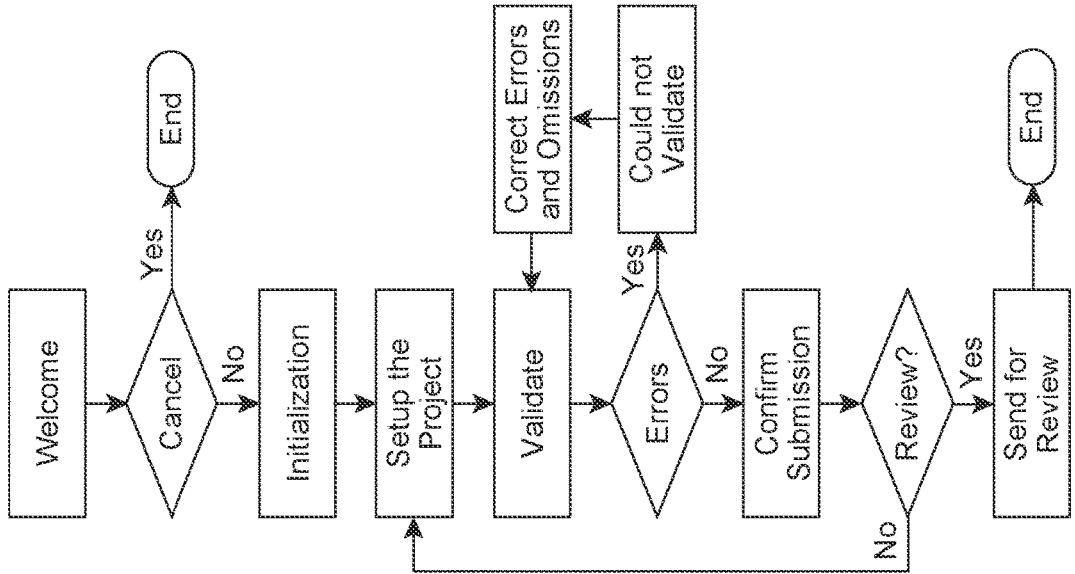

To this extent, FIG. 11A shows an illustrative flowchart for creating a new grant application according to an embodiment. A welcome work order resource can be executed to enable a user to enter initial data for a new grant, including the project contact Principal Investigator (PI). An initialization work order resource can be executed to create a new case for the grant activity based on the initial data. A setup the project work order resource can be executed to acquire additional required information for the grant from a user based on the new case. As part of the setup, one or more activities can be linked to the grant activity based on protocol(s) for the grant activity (e.g., management of human subjects, management of animal subjects, and/or the like).

FIG. 11B shows an illustrative flowchart for completing a project component description according to an embodiment. In this case, a work order resource can be executed to invite a user to be responsible for and provide details for a task included in the grant activity. If accepted, a work order resource can be executed to enable the user to provide the task details (e.g., budget items, certifications, and/or the like) and the details are confirmed by executing a second work order resource. The task inherits details from the parent activity, and details from the task are rolled up and included in the details for the parent activity.

Figure 11D:
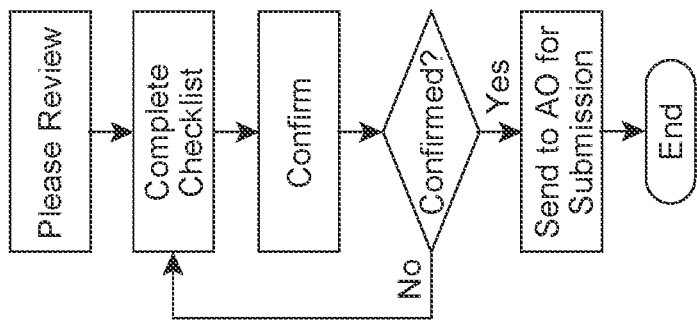
Figure 11C:
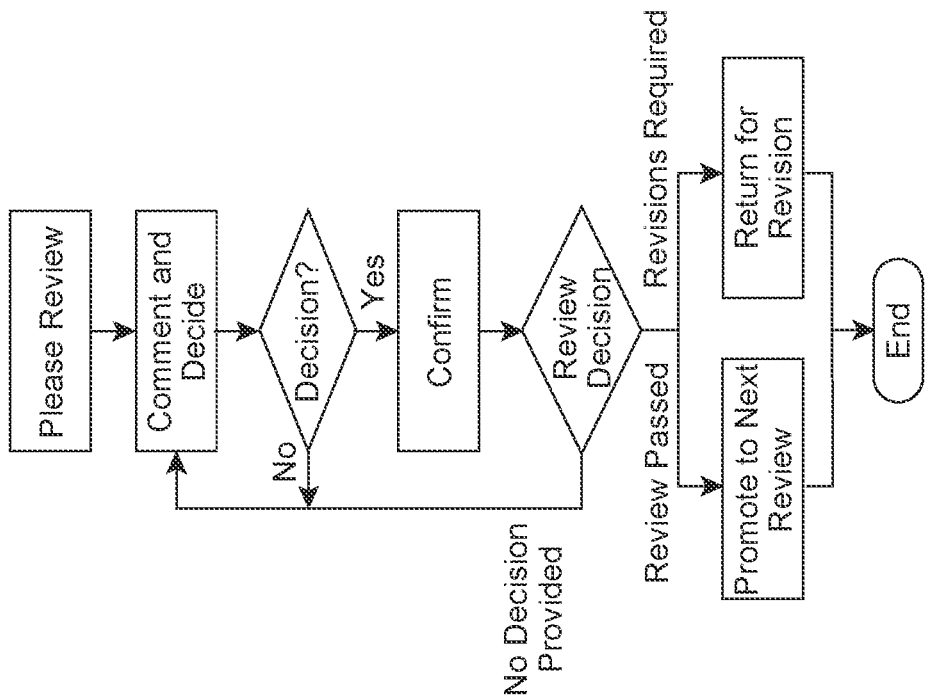
Figure 11E:
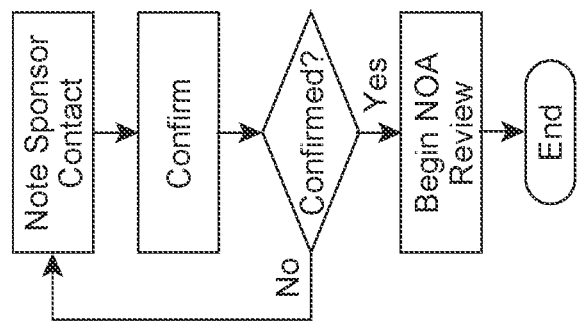

FIG. 11C shows an illustrative flowchart for reviewing a grant application according to an embodiment, in which a work order resource can be executed to enable a reviewer to review the grant application, and request revisions or promote the grant application to a next review. FIG. 11D shows an illustrative flowchart for reviewing a pre-submission checklist for a grant application according to an embodiment, in which a work order resource can be executed to generate a form to enable a user to complete a checklist, for which the checklist items are dynamically generated from context information, before sending to an authorizing official (AO) for submission. FIG. 11E shows an illustrative flowchart for electronically submitting a grant application for a grant according to an embodiment.

Figure 11F:
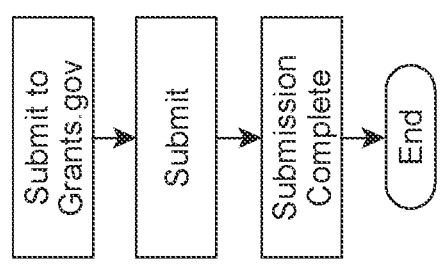
Figure 11G:
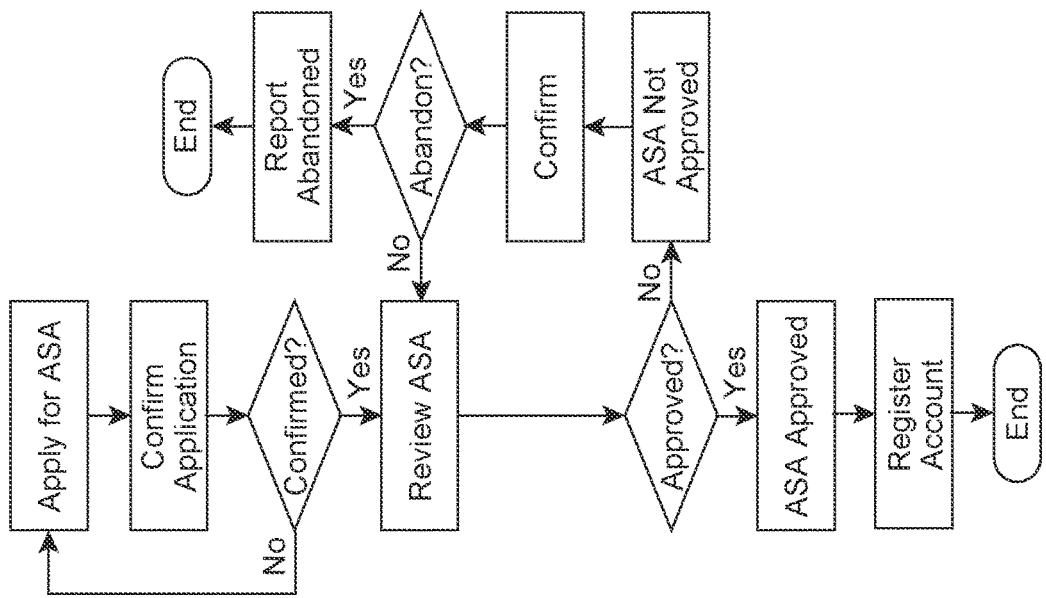

After the grant application is submitted, a granting organization (e.g., a sponsor at the granting organization) will review the application and make a determination as to funding. FIG. 11F shows an illustrative flowchart for reviewing a notice of award (NOA) received from the granting organization according to an embodiment, in which a work order resource is executed to inform the sponsor of the NOA and another work order resource is executed to begin the NOA review. FIG. 11G shows an illustrative flowchart for requesting an advanced spending account (ASA) for a grant according to an embodiment, in which a work order resource is executed to make an application for advanced spending, a work order resource is executed to enable review of the application by a department representative, who can award the funding completely or in part using a corresponding work order resource. When awarded, a work order resource is executed to assign an account for spending, otherwise a work order resource can be executed to enable the applicant to revise the application and apply for funding again.

Figure 11I:
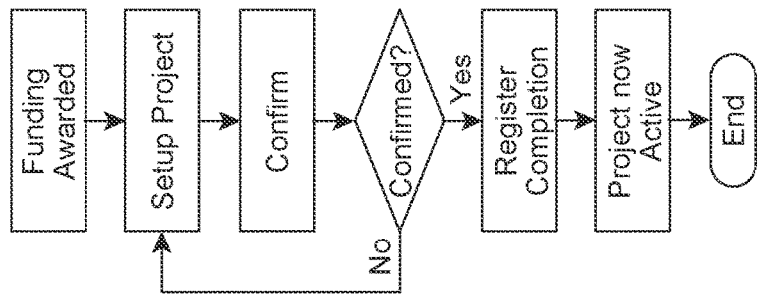
Figure 11H:
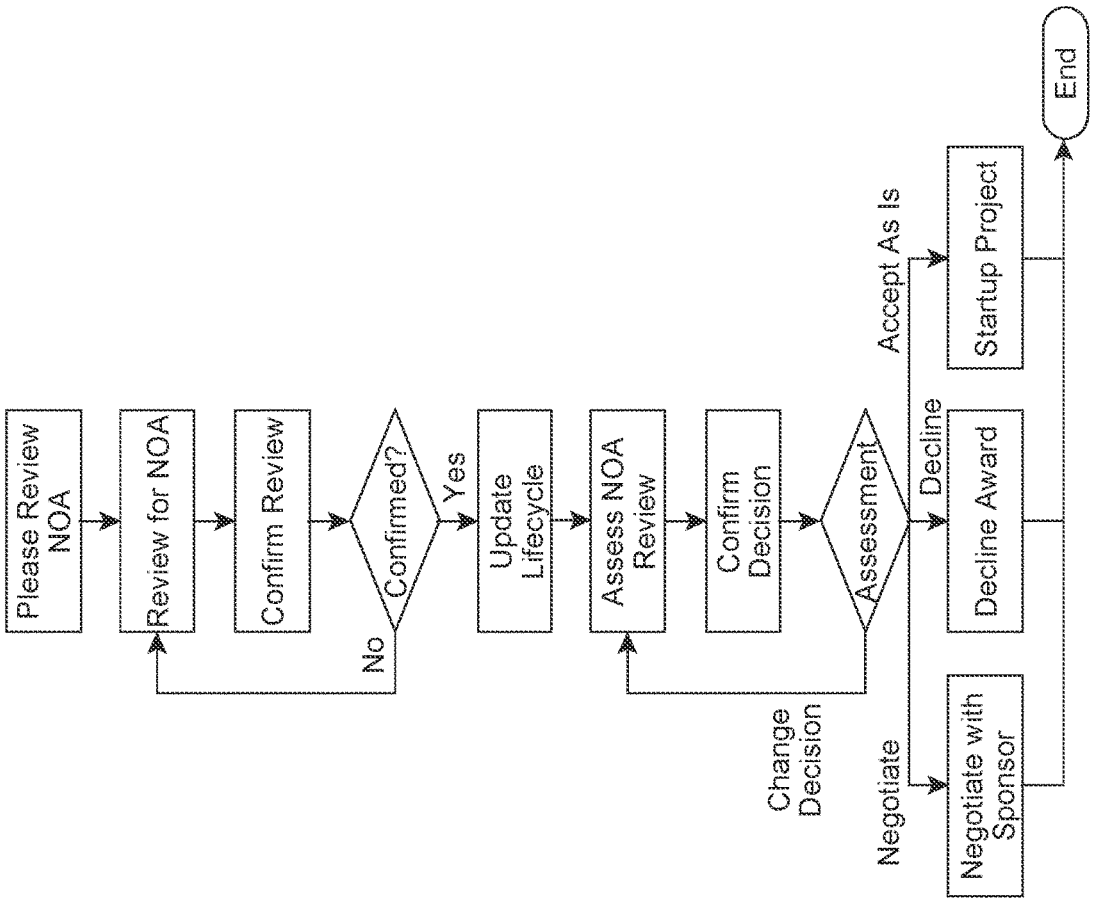

FIG. 11H shows an illustrative flowchart for reporting sponsor contact for a grant according to an embodiment, in which a work order resource is executed to enable a user to resume an activity by indicating that contact was made with a sponsor (e.g., to review a NOA). A work order resource can be executed to enable the sponsor to perform an action in response to the indication (e.g., review the NOA), and can enable the sponsor to select an option for proceeding further (e.g., negotiate with the sponsor, decline, or accept as is). In response, a work order resource can be executed to update the grant activity accordingly and a work order resource corresponding to the updated grant activity can be executed.

Figure 11K:
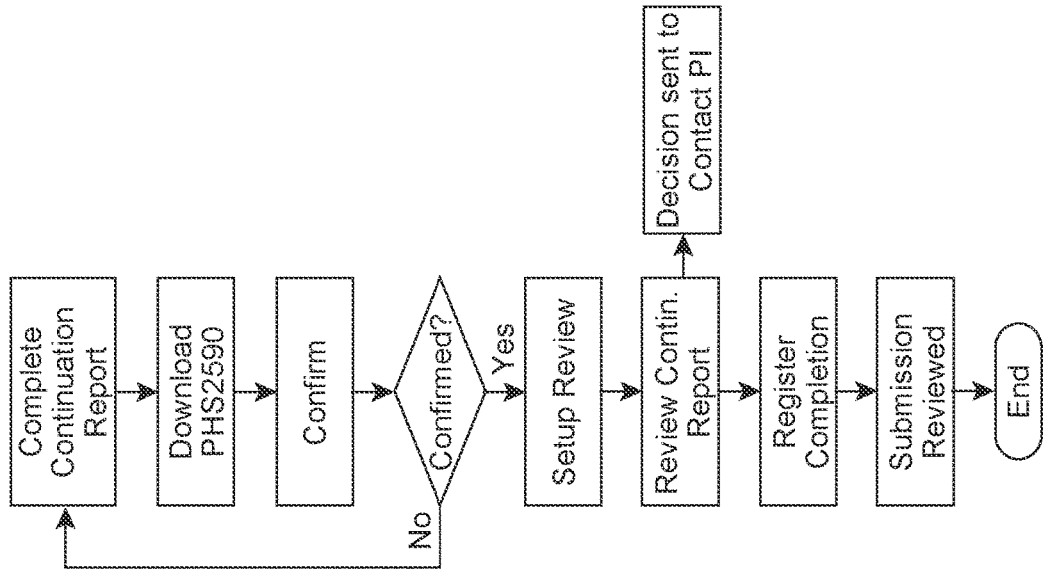
Figure 11J:
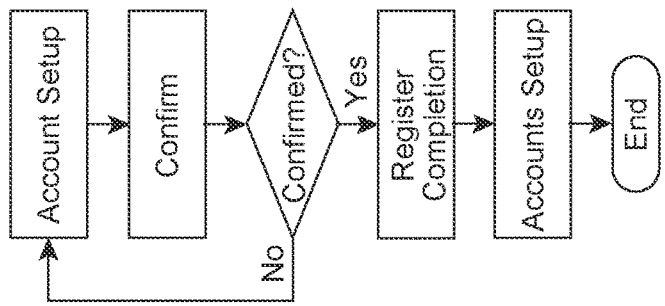

After a grant is awarded, the grant moves from an application state to an award state, and one or more tasks can be executed to setup a project and the corresponding accounts. To this extent, FIG. 11I shows an illustrative flowchart for setting up a grant project according to an embodiment, in which work order resources can be executed to set up the grant project (e.g., assign personnel, set project dates, indicate award amounts, set up deliverables, and/or the like), register completion of the setup, and indicate that the grant project is active. Subsequently, a view displaying the project can include additional options for a user, such as viewing a budget, viewing an account, and/or the like. FIG. 11J shows an illustrative flowchart for setting up accounts for a grant project according to an embodiment, in which work order resources can be executed to set up the accounts and register completion of the setup.

Figure 11M:
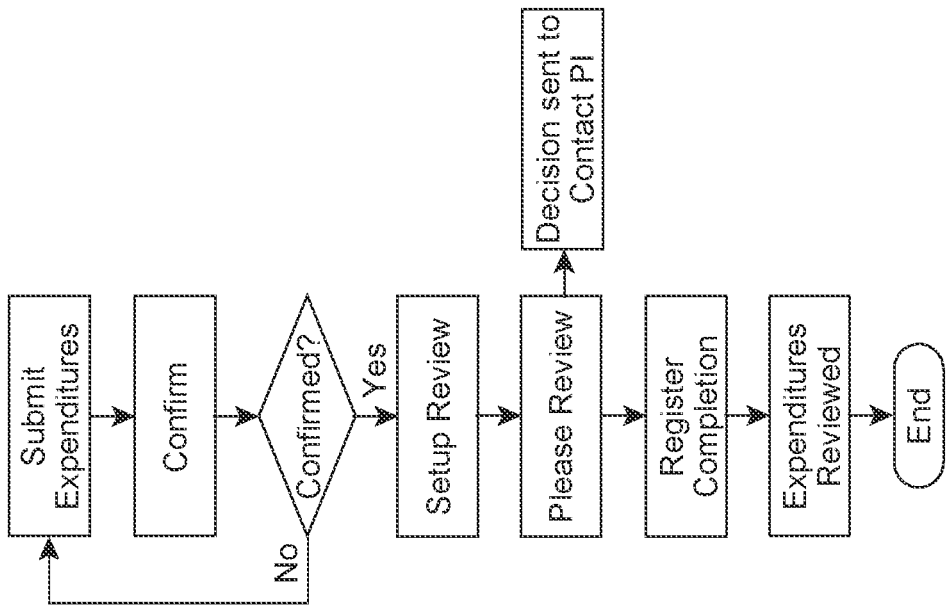
Figure 11L:
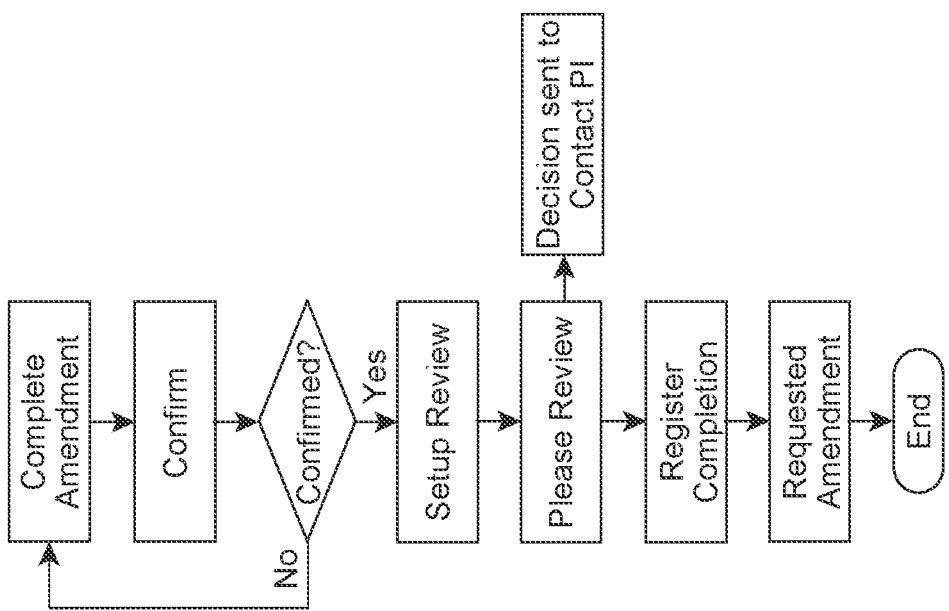

After the grant project is setup, the grant moves to a post award state. To this extent, application 12 can include various tasks for managing the grant project during the post award state. For example, FIG. 11K shows an illustrative flowchart for generating a continuation/progress report for the grant project according to an embodiment, in which work order resources are executed to generate the report and enable a user to review the report. FIG. 11L shows an illustrative flowchart for amending/modifying a resource of the grant project according to an embodiment, in which work order resources are executed to enable a user to request the amendment/modification and a user to review the request. FIG. 11M shows an illustrative flowchart for submitting expenditures according to an embodiment, in which work order resources are executed to enable a user to submit expenditure(s) and a user to review the submission.

Figure 12A:
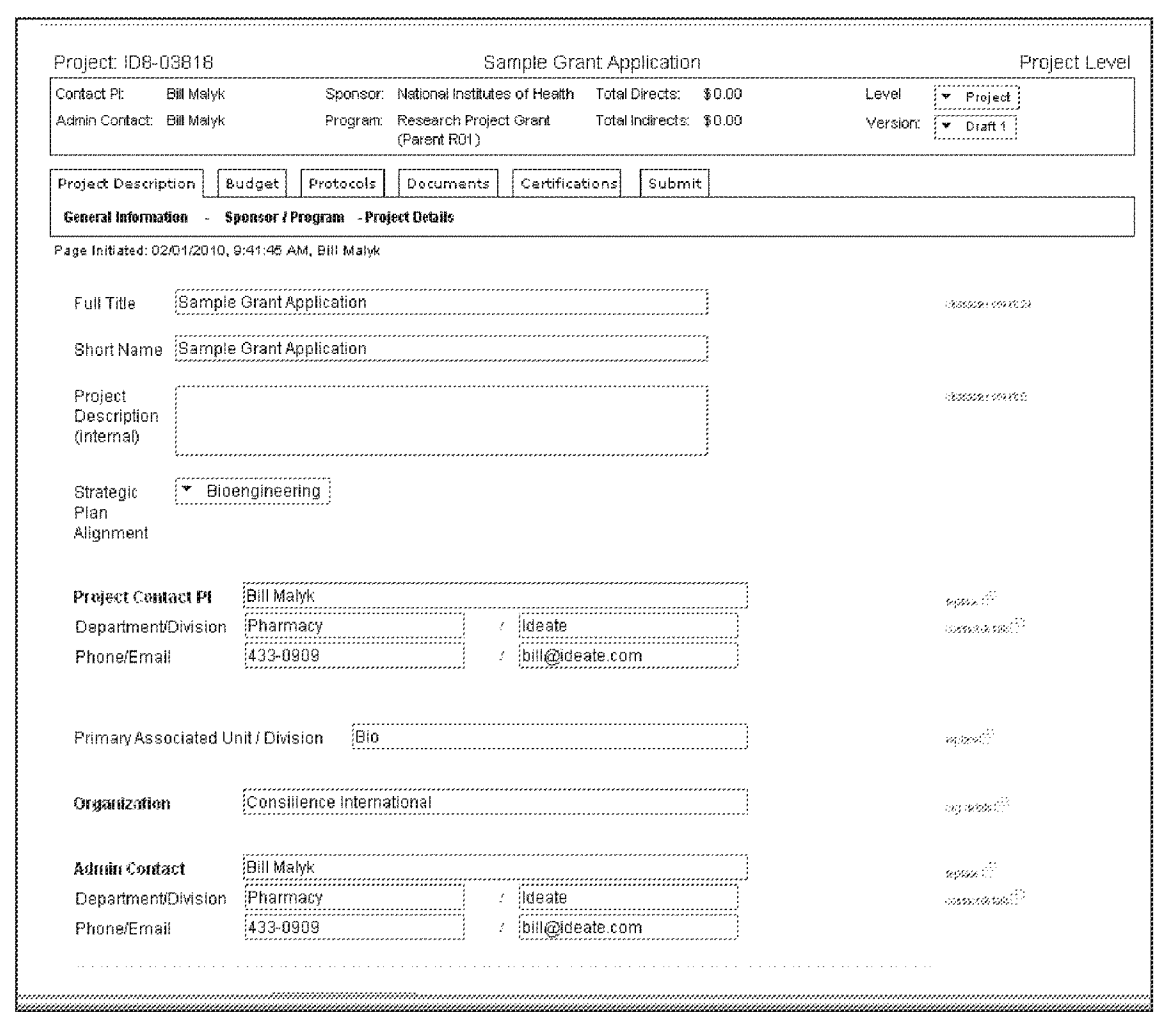

FIGS. 12A-12E show illustrative views of a grant during various portions of the lifecycle of the grant according to an embodiment. FIG. 12A shows a view that can be generated by executing a work order resource to enable a user to prepare a grant application according to an embodiment. FIG. 12B shows a view of a case folder of a grant after the grant application has been submitted for review, which can be generated by executing a work order resource according to an embodiment. FIG. 12C shows a view of a case folder of a grant after a grant project have been made active, which can be generated by executing a work order resource according to an embodiment. FIG. 12D shows a view of a case folder of a grant having an award status, which can be generated by executing a work order resource according to an embodiment. FIG. 12E shows a view of the lifecycle history of an illustrative grant after the grant application has been submitted for review, which can be generated by executing a work order resource according to an embodiment.

While shown and described herein as a method and system for performing an activity, it is understood that aspects of the invention further provide various alternative embodiments. For example, in one embodiment, the invention provides a computer program fixed in at least one computer-readable medium, which when executed, enables a computer system to perform an activity. To this extent, the computer-readable medium includes program code, such as application 12, which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as application 12, which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for performing an activity as described herein. In this case, a computer system, such as computer system 52, can be obtained (e.g., created, maintained, made available, etc.) and one or more components of application 12 can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to host an application 12 (FIG. 1) as described herein. In this case, the service provider can manage (e.g., create, maintain, support, etc.) a computer system, such as computer system 52 (FIG. 5), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for providing an interaction-specific response to a client, the system comprising:
    a memory; and
    at least one processor coupled to the memory and configured to:
        receive an interaction request from the client to perform an activity comprising a set of atomic operations, wherein the interaction request identifies a resource having a resource type, wherein the interaction request comprises in-band context information including at least authentication information and a uniform resource identifier of the resource, and wherein the interaction request further identifies a work order condition resource comprising context information for the activity that alters the set of atomic operations;
        in response to determining that the interaction request requires additional context information, retrieve server-side out-of-band context information with the in-band context information;

retrieve the work order condition resource from a remote system and retrieve the context information for the activity from the work order condition resource to determine a next valid atomic action to perform;

perform the next valid atomic action to construct, with a utility determined based on the resource type and using the in-band context information and the server-side out-of-band context information, a custom set of deliverables comprising a custom representation of the resource and a set of identifiers, wherein the custom representation of the resource is distinct from the resource; and transmit the custom set of deliverables to the client.

2. The system of claim 1, the at least one processor further configured to:

in response to receiving the interaction request, instantiate a container for processing the interaction request;

request a representation of a construction service resource for processing the interaction request; and provide the representation of the construction service resource the uniform resource identifier for use during execution of the representation of the construction service resource in the instantiated container.

3. The system of claim 1, wherein an out-of-band REST resource defines at least a portion of the server-side out-of-band context information for the interaction request.

4. The system of claim 3, wherein the out-of-band REST resource is a context REST resource referenced by the resource.

5. The system of claim 1, the at least one processor further configured to:

in response to receiving the interaction request, perform advancing constructing of the custom set of deliverables according to the resource and the in-band context information and the server-side out-of-band context information for the interaction request.

6. The system of claim 3, wherein the resource includes a relative reference to the out-of-band REST resource, and wherein the refining the custom representation of the resource includes refining and making absolute the relative reference to dynamically adjust the processing of the custom representation of the resource.

7. The system of claim 1, wherein the refining the custom representation of the resource includes resolving a set of under-specified references in the resource to construct the custom representation of the resource.

8. The system of claim 1, wherein the processing of the interaction request includes dynamically constructing the custom set of deliverables by dynamically identifying a set of next resources based on the in-band context information and the server-side out-of-band context information, wherein each next resource corresponds to a valid next interaction request.

9. The system of claim 1, wherein the in-band context information includes client-side in-band metadata and the server-side out-of-band context information includes server-side out-of-band metadata.

10. The system of claim 9, wherein the client-side in-band metadata comprises the authentication information and the uniform resource identifier within header information of the interaction request.

11. A method, comprising:

receiving, by one or more processors, an interaction request from a client to perform an activity comprising a set of atomic operations, wherein the interaction request identifies a resource having a resource type, wherein the interaction request comprises in-band context information including at least authentication information and a uniform resource identifier of the resource, and wherein the interaction request further identifies a work order condition resource comprising context information for the activity that alters the set of atomic operations;

in response to determining that the interaction request requires additional context information, retrieving server-side out-of-band context information with the in-band context information;

retrieving the work order condition resource from a remote system and retrieving the context information for the activity from the work order condition resource to determine a next valid atomic action to perform;

performing the next valid atomic action to construct, with a utility determined based on the resource type and using the in-band context information and the server-side out-of-band context information, a custom set of deliverables comprising a custom representation of the resource and a set of identifiers, wherein the custom representation of the resource is distinct from the resource; and transmitting the custom set of deliverables to the client.

12. The method of claim 11, further comprising performing in response to receiving the interaction request:

instantiating a container for processing the interaction request;

requesting a representation of a construction service resource for processing the interaction request; and providing the representation of the construction service resource the uniform resource identifier for use during execution of the representation of the construction service resource in the instantiated container.

13. The method of claim 11, wherein an out-of-band REST resource defines at least a portion of the server-side out-of-band context information for the interaction request.

14. The method of claim 13, wherein the out-of-band REST resource is a context REST resource referenced by the resource.

15. The method of claim 11, further comprising, in response to receiving the interaction request, advancing constructing the custom set of deliverables according to the resource and the in-band context information and the server-side out-of-band context information for the interaction request.

16. The method of claim 13, wherein the resource includes a relative reference to the out-of-band REST resource, and wherein the refining the custom representation of the resource includes refining and making absolute the relative reference to dynamically adjust the processing of the custom representation of the resource.

17. The method of claim 11, wherein the refining the custom representation of the resource includes resolving a set of under-specified references in the resource to construct the custom representation of the resource.

18. The method of claim 11, wherein the processing of the interaction request includes dynamically constructing the custom set of deliverables by dynamically identifying a set of next resources based on the in-band context information and the server-side out-of-band context information, wherein each next resource corresponds to a valid next interaction request.

19. The method of claim 11, wherein the in-band context information includes client-side in-band metadata and the server-side out-of-band context information includes server-side out-of-band metadata.

20. The method of claim 19, wherein the client-side in-band metadata comprises the authentication information and the uniform resource identifier within header information of the interaction request.

* * * * *